(12) United States Patent
Barker et al.

(10) Patent No.: US 9,118,361 B2
(45) Date of Patent: Aug. 25, 2015

(54) PHASED ARRAY ANTENNA SYSTEM WITH MULTIPLE BEAM

(75) Inventors: David Edwin Barker, Worcestershire (GB); Philip Edward Haskell, Hampshire (GB); Louis David Thomas, Worcestershire (GB)

(73) Assignee: Quintel Technology Limited, Bristol (GB)

( * ) Notice: Subject to any disclaimer, the term of this patent is extended or adjusted under 35 U.S.C. 154(b) by 29 days.

(21) Appl. No.: 12/278,814

(22) PCT Filed: Feb. 1, 2007

(86) PCT No.: PCT/GB2007/000348
§ 371 (c)(1),
(2), (4) Date: Aug. 8, 2008

(87) PCT Pub. No.: WO2007/091024
PCT Pub. Date: Aug. 16, 2007

(65) Prior Publication Data
US 2009/0058725 A1   Mar. 5, 2009

(30) Foreign Application Priority Data
Feb. 9, 2006   (GB) .................................. 0602530.8

(51) Int. Cl.
*H04B 1/00*   (2006.01)
*H04B 1/04*   (2006.01)
(Continued)

(52) U.S. Cl.
CPC .................................. *H04B 7/0408* (2013.01)

(58) Field of Classification Search
CPC ............................. H04B 7/0617; H04B 7/0408
USPC ............... 455/562.1, 103, 561, 213; 342/372, 342/377, 371, 368; 343/757; 375/260
See application file for complete search history.

(56) References Cited

U.S. PATENT DOCUMENTS 5,561,842 A    10/1996 Ritter et al.
6,232,920 B1 *  5/2001 Brookner et al. ............. 342/372
(Continued)

FOREIGN PATENT DOCUMENTS

EP    1432144    6/2004
EP    1528830    5/2005
(Continued)

*Primary Examiner* — Temesgh Ghebretinsae
*Assistant Examiner* — Devan Sandiford

(57) ABSTRACT

A phased array antenna system with multiple beams incorporates a CDMA base station (32) with multiple ports $34_1$ to $36_N$ for positive and negative polarisation signals connected to ports $40_1$ to $42_N$ of an antenna assembly (44). The antenna assembly (44) is single stack and multi-port, and it provides multiple antenna beams with polarisation diversity and different vertical angles of electrical tilt which are fixed or variable. It is suitable for 3G mobile radio using CDMA. Different antenna beams may carry groups of data channels distinguished either by different channelisation process coding or by different scrambling process coding. An operator may use two or more beams simultaneously. Control of angle of electrical tilt of antenna beams may be implemented by introducing variable relative delay between signals associated with different antenna ports A(+) and B(+) and feeding them to a signal splitting and combining network providing antenna element signals.

13 Claims, 24 Drawing Sheets

(51) Int. Cl.
*H04M 1/00* (2006.01)
*H01Q 3/00* (2006.01)
*H04B 7/04* (2006.01)

(56) References Cited

U.S. PATENT DOCUMENTS

| | | | |
|---|---|---|---|
| 6,666,714 B1 | 12/2003 | Li et al. | |
| 7,433,713 B2* | 10/2008 | Haskell et al. | 455/562.1 |
| 8,185,162 B2* | 5/2012 | Haskell et al. | 455/562.1 |
| 2002/0013133 A1* | 1/2002 | Lam | 455/137 |
| 2003/0032454 A1* | 2/2003 | Judd | 455/562 |
| 2004/0077379 A1* | 4/2004 | Smith et al. | 455/562.1 |
| 2004/0087294 A1* | 5/2004 | Wang | 455/276.1 |
| 2005/0128141 A1 | 6/2005 | Howell | |
| 2005/0164664 A1* | 7/2005 | DiFonzo et al. | 455/277.1 |
| 2005/0213529 A1* | 9/2005 | Chow et al. | 370/320 |
| 2005/0277443 A1* | 12/2005 | Ozluturk | 455/562.1 |
| 2006/0019710 A1* | 1/2006 | Ylitalo | 455/562.1 |
| 2008/0211716 A1* | 9/2008 | Haskell | 342/368 |
| 2009/0075701 A1* | 3/2009 | Haskell et al. | 455/562.1 |
| 2009/0167605 A1* | 7/2009 | Haskell | 342/372 |
| 2009/0322610 A1* | 12/2009 | Hants et al. | 342/372 |
| 2010/0144289 A1* | 6/2010 | Haskell et al. | 455/83 |
| 2011/0102262 A1* | 5/2011 | Haskell | 342/372 |
| 2013/0044650 A1* | 2/2013 | Barker et al. | 370/278 |

FOREIGN PATENT DOCUMENTS

| | | |
|---|---|---|
| WO | WO 99/65262 | 12/1999 |
| WO | WO 01/29926 | 4/2001 |
| WO | WO 01/99240 | 12/2001 |
| WO | WO 02/082581 | 10/2002 |
| WO | WO 02/082704 | 11/2002 |
| WO | WO 2004/010724 | 1/2004 |
| WO | WO 2004/088790 | 10/2004 |
| WO | WO 2004/102739 | 11/2004 |
| WO | WO 2005/048401 | 5/2005 |

\* cited by examiner

PHASED ARRAY ANTENNA SYSTEM WITH MULTIPLE BEAM

This invention relates to a phased array antenna system with multiple beams and a method for communications employing such a system. The invention may be used in cellular mobile radio networks, commonly referred to as mobile telephone networks, particularly (but not exclusively) technologies using code division multiple access (CDMA) methods, which include UMTS (also referred to Wideband code division multiple access, or WCDMA), and the cdma2000 family of technologies.

A phased array antenna incorporates an array of antenna elements, and transmit signals are passed to and receive signals are passed from the antenna elements via a network referred to as a corporate feed. Such an antenna is directional: i.e. it has an antenna beam which determines transmit or receive direction. Tilting of an antenna may be accomplished by changing the direction in which the antenna points (mechanical tilt), or by phased array principles, i.e. applying a phase shift to antenna element signals, the phase shift varying with element position in the array (electrical tilt). A combination of mechanical and electrical tilt is also used, see U.S. Pat. No. 6,067,054 to Johannisson et al. The angle of electrical tilt is an important parameter in optimising the performance of systems employing directional antennas: adjustment of this angle allows a communications cell to be optimised as regards both geographical coverage and interference with adjacent cells.

The ability to adjust the angle of electrical tilt of an antenna is beneficial in cellular mobile radio networks, as is the ability to direct two or more antenna beams with different angles of electrical tilt into a single geographical sector. This might occur, for example, if a single operator wished to increase traffic capacity or coverage area of a sector. It may also be beneficial to have different angles of electrical tilt in transmit and receive modes.

For the purposes of this specification, the expression 'single antenna' also means 'single antenna stack': an 'antenna stack' is defined as a single line of antenna elements which may consist of:
  a) a single set of antenna elements connected to a common corporate feed and providing a single signal polarisation, for example, linear vertical, linear horizontal, linear and inclined at 45 degrees to the vertical, or circular;
  b) a single set of antenna elements, each element (e.g. a patch antenna element) having two orthogonal ports with each port connected to its respective corporate feed and providing dual polarisations (e.g. linear vertical and horizontal, linear and inclined at plus and minus 45 degrees to the vertical, left and right hand circular polarisation): two ports are orthogonal if a signal input to either port is not significantly coupled to the other so that they are substantially isolated from one another; or
  c) two co-located sets of antenna elements (e.g. antenna elements each of which is a pair of crossed dipoles with a common centre) each connected to a respective corporate feed and providing dual polarisation, for example, linear vertical and horizontal, linear and inclined at plus and minus 45 degrees, left and right hand circular or elliptical polarisation.

WO 99/65262 and U.S. Pat. No. 6,666,714 disclose the use of separate antennas for transmit and receive beams. The use of separate antennas for transmit and receive beams has a number of disadvantages:
  a) two antennas are required instead of one, resulting in additional weight, cost and wind loading and an increased visual impact on the environment for a system mounted on an antenna support mast;
  b) each antenna is only used for one signal, either transmit or receive;
  c) the two antennas are at different heights, upper and lower, and have different propagation path loss characteristics;
  d) local planning authority requirements or zoning restrictions limit the height of the upper antenna so that the lower antenna operates with relatively greater path loss due to its lower height; and
  e) further antenna beams require the number of antennas to be increased with additional cost and visual impact.

WO 01/29926 discloses two separate antenna stacks housed within a single radome: each stack has a respective antenna beam which is used for both transmit and receive signals. The use of separate stacks housed within a common radome provides a small reduction in visual impact on the environment, but in other respects has the disadvantages associated with separate antennas.

A UMTS telecommunications radio system is disclosed in WO 2004/010724 (inventors Klomp et al.): this system implements cell splitting in azimuth and cell splitting in elevation using multiple separate antennas disposed in two concentric rings. Each ring of antennas provides cell splitting in azimuth and the rings of antennas have different vertical aperture and tilt angles providing cell splitting in elevation. In one example an inner ring has twenty four separate antennas with a vertical aperture angle of 10 degrees and 10 degrees tilt, and an outer ring has seventy-two separate antennas with a vertical aperture angle of 5 degrees and 2.5 degrees tilt. Conventional UMTS cell deployment implements azimuthal cell splitting for cells using the same RF (radio frequency) channel frequency, and distinguishes cells by different (UMTS) scrambling codes, which are associated with independent base stations. WO 2004/010724 mentions the need to build a UMTS radio network, and the associated problem of finding suitable base station sites.

U.S. Pat. No. 5,561,842 to Ritter et al. discloses a mobile radio network using the cdma access method with cell splitting in azimuth and elevation using multiple antennas to define a concentric cell ring structure subdivided into sectors. Adjacent rings are distinguished by different frequency bands, pseudo noise (PN) spread codes, time slots and/or polarization levels; here spread codes as employed in the cdma access method are codes associated with a single traffic channel (e.g. associated with a single subscriber or a single mobile telephone handset for example), and are thereby distinct from the cell level scrambling coding process using scrambling codes in the cdma and WCDMA access methods.

It is an object of the invention to provide an alternative form of antenna system and an associated method for communications.

The present invention provides an antenna system incorporating a single antenna stack for providing a plurality of antenna beams with different vertical angles of electrical tilt, groups of data channels for providing data for transmission via the antenna beams and coding means for applying codes to data in the data channels to implement a channelisation process and a scrambling process with coding in at least one of these processes differing between groups of data channels to enable data associated with individual data channels to be distinguished.

The invention provides the advantage that it does not rely on physical separation of antennas to enable data associated with individual data channels to be distinguished. Instead it achieves this with the use of a single antenna stack providing multiple antenna beams with different vertical tilt angles and differences in coding processes between groups of data channels. The invention therefore avoids the need to provide multiple antenna arrays for multiple angles of electrical tilt, i.e. as many antenna arrays as there are angles of electrical tilt, which results in a composite antenna assembly in a radome which is larger, heavier, more expensive, requiring greater structural strength to resist forces due to wind, rain or snow. Moreover, multiple antenna arrays are at different heights and consequently have different propagation characteristics and path losses.

In a preferred embodiment of the invention, the antenna stack is arranged to provide at least some antenna beams with mutually orthogonal polarisations and the scrambling process is arranged to provide different coding for orthogonally polarised beams. The antenna stack may have a plurality of ports per polarisation, and the antenna system may have a tilt controller for controlling time delay between signals applied to ports associated with like polarisation to provide antenna beam tilt control.

The coding means may apply like coding to groups of data channels for the channelisation process but different coding to groups of data channels for the scrambling process. The coding means may alternatively apply different coding to groups of data channels for the channelisation process but like coding to groups of data channels for the scrambling process. It may provide different coding for data channels associated with different antenna beams.

The antenna system may include isolating filters for combining RF transmit signals of different non-contiguous frequencies for antenna input in combination and splitters for dividing receive signals between different receivers. The antenna system may be adapted for use with multiple contiguous frequencies if the antenna stack has orthogonal antenna ports by including means for dividing the frequencies into non-contiguous frequency groups containing filter separable frequencies for combining in the isolating filters, the frequency groups being arranged to pass to respective orthogonal antenna ports.

The antenna system may be for use with multiple sectors and may incorporate coupling means arranged to combine signals coded differently in the scrambling process and to generate therefrom antenna beams for different sectors such that each sector has antenna beams with different scrambling process coding.

In another aspect, the present invention provides a method for communications incorporating the steps of:
  a) arranging a single antenna stack to provide a plurality of antenna beams with different vertical angles of electrical tilt,
  b) using groups of data channels to provide data for transmission via the antenna beams, and
  c) applying codes to data in the data channels to implement a channelisation process and a scrambling process with coding in at least one of these processes differing between groups of data channels to enable data associated with individual data channels to be distinguished.

In a preferred embodiment of the invention, at least some antenna beams have mutually orthogonal polarisations and the scrambling process provides different coding for orthogonally polarised beams. The antenna stack may have a plurality of ports per polarisation, and time delay between signals applied to ports associated with like polarisation may be controlled to provide antenna beam tilt control.

Like coding may be applied to groups of data channels for the channelisation process but different coding applied to groups of data channels for the scrambling process. Alternatively, different coding may be applied to groups of data channels for the channelisation process but like coding applied to groups of data channels for the scrambling process. Different coding may be applied to data channels associated with different antenna beams.

Isolating filters may be used for combining RF transmit signals of different non-contiguous frequencies for antenna input in combination and splitters may be used for dividing receive signals between different receivers. The method may be adapted for use with multiple contiguous frequencies when the antenna stack has orthogonal antenna ports by dividing the frequencies into non-contiguous frequency groups containing filter separable frequencies for combining in the isolating filters with the frequency groups passing to respective orthogonal antenna ports.

The method may be implemented with multiple sectors and may combine signals coded differently in the scrambling process and generate therefrom antenna beams for different sectors such that each sector has antenna beams with different scrambling process coding.

In order that the invention might be more fully understood, embodiments thereof will now be described, by way of example only, with reference to the accompanying drawings, in which:—

FIGS. 1 and 2 schematically show prior art production of multiple antenna beams;

Figure 1:
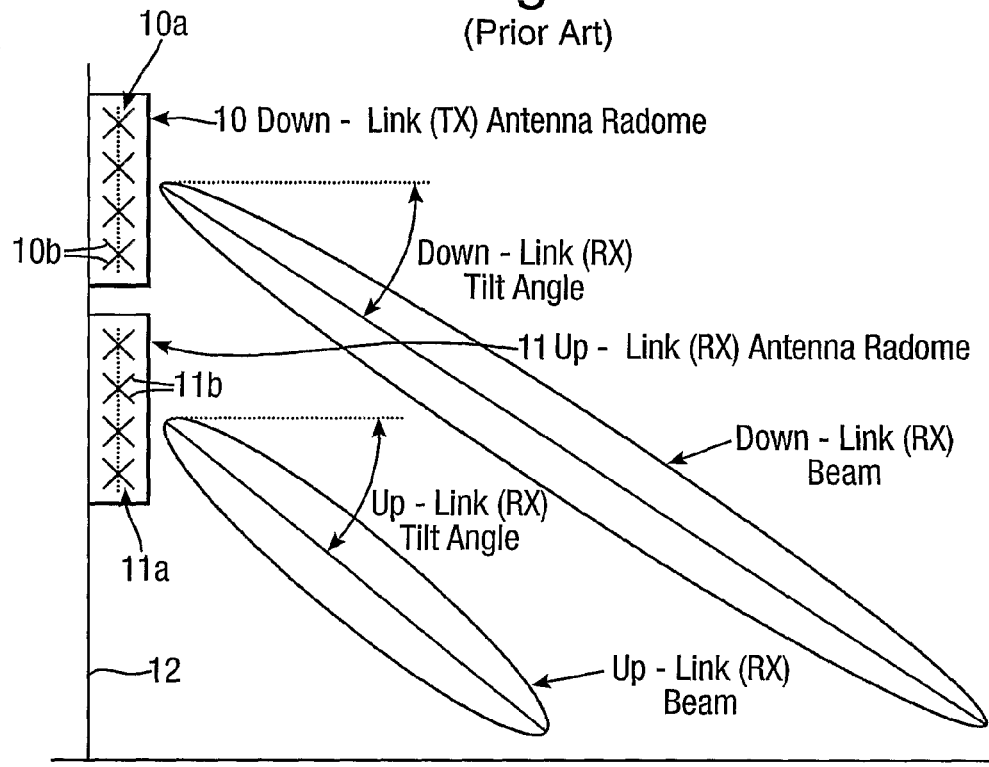

Referring to FIG. 1, prior art radomes 10 and 11 house separate antenna assemblies 10a and 11a each consisting of a line of crossed dipoles such as 10b and 11b. The radomes 10 and 11 are mounted one above the other on a mast 12. The antenna assemblies 10a and 11a are used for base station transmit (down-link) and receive (up-link) signals respectively: see e.g. WO 99/65262 and U.S. Pat. No. 6,666,714.

The use of two antenna radomes 10 and 11 housing separate antenna assemblies 10a and 11a results in two antennas being required instead of one: this in turn results in additional weight, cost, wind loading and intrusion into the environment. Each antenna assembly is used for one respective signal only, and the two antenna assemblies have different propagation characteristics and path losses because of their different heights. Addition of antenna beams requires more antenna assemblies.

Figure 2:
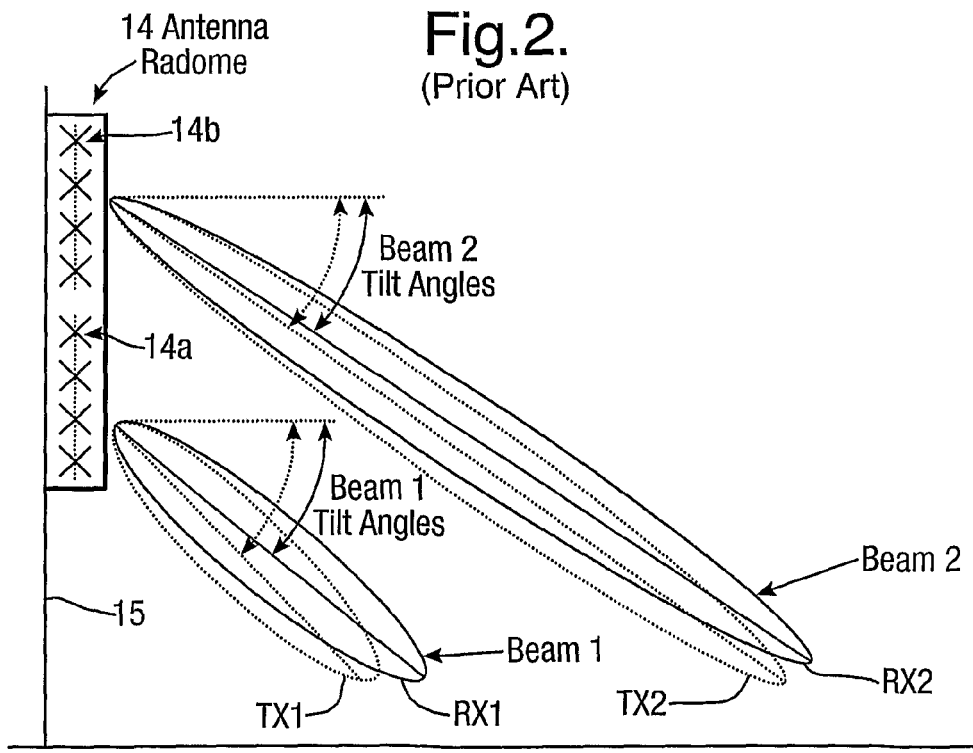

FIG. 2 shows a single prior art radome 14 mounted on a mast 15 and housing two separate antenna assemblies 14a and 14b. Antenna assembly 14a has transmit and receive beams TX1 and RX1, the former shown dotted. Similarly, antenna assembly 14b has transmit (dotted) and receive (solid line) beams TX2 and RX2. For illustrational clarity, each transmit and receive beam pair TX1/RX1, TX2/RX2 is shown with greatly exaggerated separation of its constituent beams. In practice, this separation is very small and due to a small difference in frequency. As indicated, each of the antenna assemblies 14a and 14b is used for both transmit and receive signals as described in WO 01/29926. The use of separate antenna assemblies housed in one radome reduces environmental intrusion a little, but in other respects it has the disadvantages associated with separate antennas.

Figure 3:
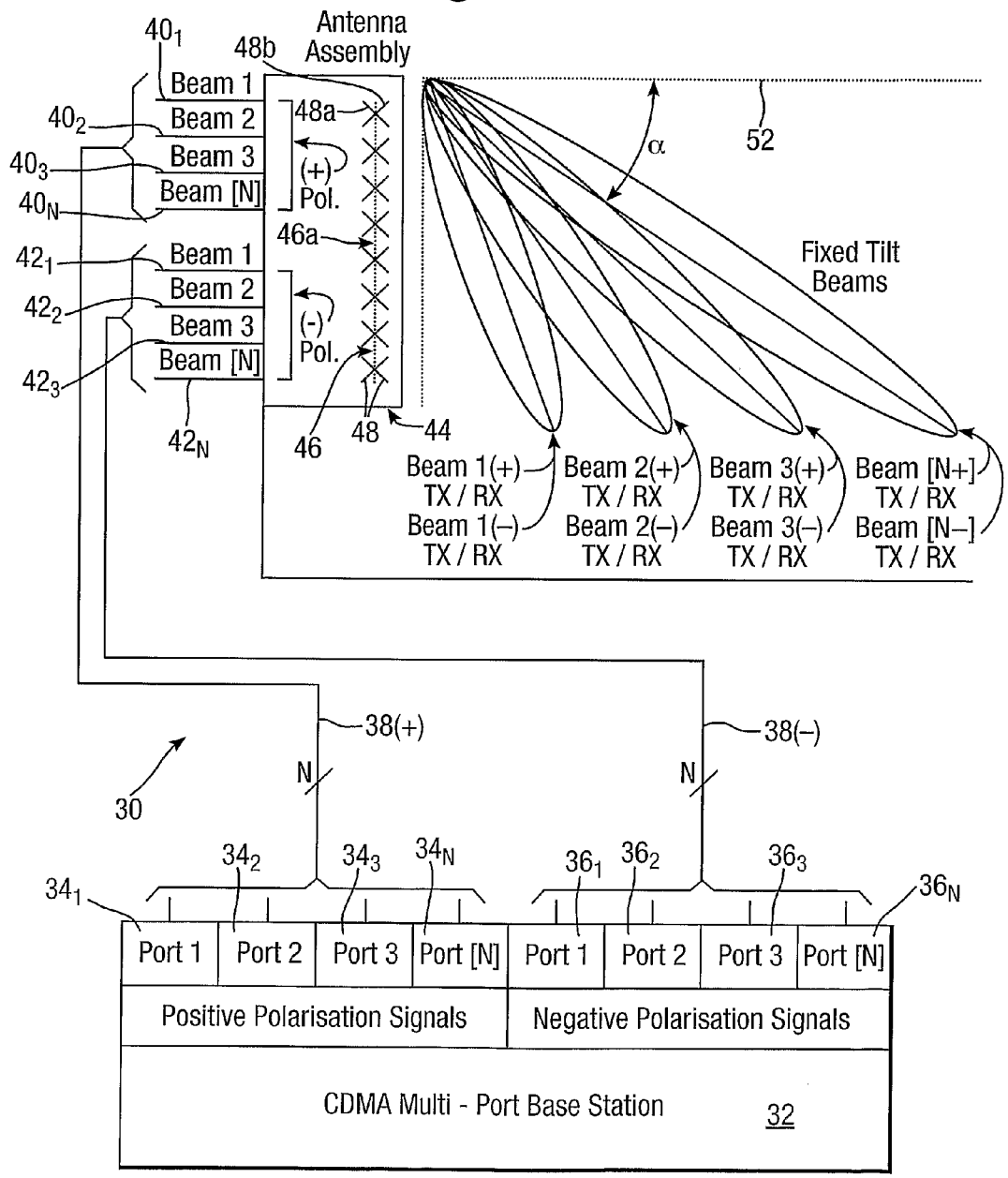
FIG. 3 illustrates an embodiment of the invention providing multiple beams using a multi-port base station.

Referring to FIG. 3, an embodiment 30 of the invention in the form of a fixed tilt antenna system incorporates a base station 32 implementing a code division multiple access (CDMA) technique such as the UMTS/WCDMA or cdma/cdma2000 access. The base station 32 has N ports $34_1$ to $34_N$ for positive polarisation signals and a further N ports $36_1$ to $36_N$ for negative polarisation signals: here N is a positive integer equal to 4 or more and indicates that the number of ports is a matter of choice. The base station ports $34_1$ to $36_N$ are connected by first and second N-element links 38(+) and 38(−) to respective ports $40_1$ to $42_N$ of an antenna assembly 44. Antenna ports $40_1$ to $40_N$ are for positive polarisation signals and are connected to the first N-element link 38(+); antenna ports $42_1$ to $42_N$ are for negative polarisation signals and are connected to the second N-element link 38(−).

Strictly speaking, the expressions positive polarisation and negative polarisation refer to signals in free space immediately after transmission from a transmit antenna and immediately prior to reception at a receive antenna. A signal in circuitry within the antenna system 30 was however either previously received with or will later be transmitted with a certain polarisation, and it is convenient to refer to it by that polarisation to distinguish it. This convention will be followed throughout this specification.

The antenna ports $40_1$ to $42_N$ are connected to a corporate feed (not shown) incorporated in the antenna assembly 44 in the form of a Butler matrix coupled to an amplitude taper network to reduce the amplitude of the side lobes to less than 18 dB below a boresight level. A Butler matrix is of known kind in the art of antennas and is described by Butler, J., Lowe, R. "Beam—Forming Matrix Simplifies Design of Electrically Scanned Antennas", Electronics Design, Apr. 12, 1961, pp 170-173. It has the property that, when used with an appropriate antenna stack, it configures N transmit signals from the base station 30 into N output beams, and converts signals received in N beams into N receive signals for transfer to the base station 32, i.e. each beam corresponds to a respective pair of signals, one transmit signal and one receive signal. Each beam can correspond to more signals if a second polarisation is incorporated for the purposes of polarisation diversity for transmit or receive signals.

The corporate feed is connected to an antenna stack 46 in the antenna assembly 44, the stack 46 being a single stack which is a vertically disposed linear array of pairs of crossed dipole antenna elements such as 48. The dipoles of each crossed dipole pair 48 are orthogonal to one another and intersect at their mid-points. Dipoles such as 48a extending upwardly to the left have +45 degree polarisation (positive polarisation), whereas dipoles such as 48b extending upwardly to the right have −45 degree polarisation (negative polarisation), relative in each case to a vertical stack axis shown as a dotted line 46a.

The antenna assembly 44 has N beams 1(+) to N(+) (as illustrated N=4) for positive polarisation signals associated with dipoles such as 48a, and, superimposed on those beams respectively, N further beams 1(−) to N(−) for negative polarisation signals associated with dipoles such as 48b. The beams 1(+) to N(+) have fixed vertical angles of electrical tilt (such as a to the horizontal 52) which are different to one another: they are therefore separated in the elevation plane and beam x(+) is superimposed on beam x(−), where x=1, 2, 3 . . . N. The beams 1 (+) to N(−) may also be tilted by feeding pairs of ports with signals having the same carrier frequency but different phase. FIG. 3 therefore illustrates an embodiment of the invention in which a single stack, multi-port, multi-beam antenna is connected by a feeder for each port to a multi-port base station and provides in the vertical elevation a plurality of positive and negative polarisation antenna beam pairs. An operator may use two or more beams simultaneously. Paired antenna beams with like vertical angle of electrical tilt can be distinguished and separated from one another because of their different polarisations.

The antenna system 30 is suitable for cellular mobile radio systems using CDMA, and may be used to implement code division tilt (as hereinafter defined) in the antenna's vertical elevation or vertical elevation plane, i.e. different vertical angles of electrical tilt. As will be described in more detail later, CDMA provides physical channels carrying traffic and distinguished by coding in a channelisation process or a scrambling process.

As is the case for other embodiments of the invention also, the expressions "vertical elevation" and "vertical elevation plane" are used for convenience: it does not matter if this elevation or elevation plane is inclined to the vertical to some extent or is not geometrically planar. The vertical elevation or vertical elevation plane need to be sufficiently near the geographical vertical to enable antenna beams to be defined which are arranged upwardly in succession, and the expressions "vertical elevation" and "vertical elevation plane" are to be construed accordingly. The important point is that two or more different beams from the same antenna stack have different vertical angles of electrical tilt.

The embodiment 30 enables the traffic capacity of an antenna site to be adapted to a geographic traffic requirement. Although it has been described in terms of a dual polarisation antenna assembly with ±45 degree polarisations, the invention is also applicable to a single polarisation antenna, or an antenna having other polarisations, e.g. vertical and horizontal or left and right hand circular or elliptical polarisation.

Each antenna beam may (as described) have a fixed pre-set angle of electrical tilt; alternatively, as will be described for later embodiments, each beam may have an angle of electrical tilt which is adjustable independently and remotely from the antenna stack 46. The antenna system 30 allows an operator to use two or more beams simultaneously, and each beam may be used either for transmit, receive, or both transmit and receive. By adjustment of the angle of electrical tilt, the geographical coverage of an individual cell can be improved and interference between adjacent cells reduced.

As will be described later in more detail, an antenna stack may be used by a single operator to transmit or receive multiple beams carrying respective cell identification codes, e.g. scrambling codes, all on the same radio carrier frequency, or shared between two or more operators on different radio frequency carriers.

Figure 4:
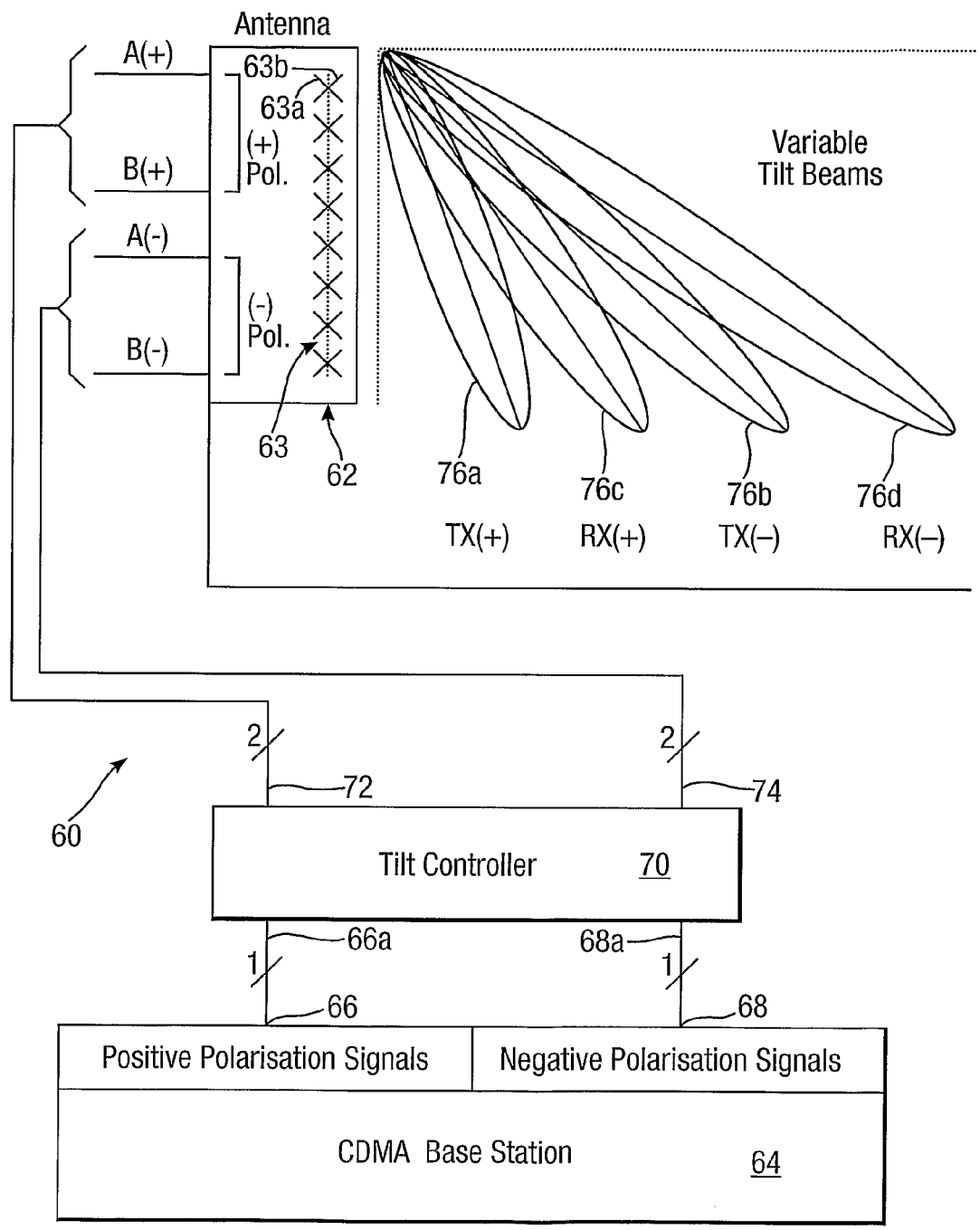
FIG. 4 illustrates an embodiment of the invention providing multiple beams with control of electrical beam tilt.

Referring now to FIG. 4, a further antenna system embodiment 60 of the invention has a dual port antenna assembly 62 with a crossed dipole antenna stack 63 having positive and negative polarisation dipoles such as 63a and 63b. The dipoles such as 63a and 63b can be considered as two vertical arrays of dipoles superimposed on one another; each array comprises like-polarised dipoles orthogonal to the other array's dipoles. This embodiment is configured to provide multiple antenna beams each with an angle of electrical tilt which is adjustable by altering an amplitude or phase difference between signals passing between a CDMA base station 64 and an antenna assembly 62. Electrical tilt which is adjustable is this way is known in the prior art from published international applications WO 2004/088790, WO 2004/102739 and WO 2005/048401. In each of these prior art systems a first pair of antenna assembly ports is used for two positive polarisation signals designated A(+) and B(+). A second pair of antenna assembly ports is used for two negative polarisation signals designated A(−) and B(−).

In WO 2004/088790, the angle of electrical tilt of an antenna assembly is adjustable by introducing a difference in amplitude (derived from a phase difference) between signals of the same carrier frequency applied simultaneously to first and second ports respectively. In WO 2004/102739 and WO 2005/048401, such an angle of electrical tilt is adjustable by introducing a difference in phase between such signals applied to ports likewise. The prior art antenna assembly has a signal combining network for forming vectorial combinations of such signals to provide antenna element drive signals. In the present embodiment tilting by phase difference is used as in WO 2004/102739 and WO 2005/048401, but tilting by amplitude difference is also useable as in WO 2004/088790.

The base station 64 has a first input/output (I/O) port 66 for positive polarisation signals and a second I/O port 68 for negative polarisation signals. The ports are connected by respective single (1/) feeders 66a and 68a to a tilt controller 70: the tilt controller 70 converts transmit signals received from the first I/O port 66 into a first pair of signals with positive polarisation and a first variable relative phase shift therebetween, and outputs them on respective feeders of a first feeder pair (2/) 72. It also likewise converts transmit signals received from the second I/O port 68 into a second pair of signals with negative polarisation and a second variable relative phase shift therebetween, and outputs them on respective feeders of a second feeder pair (2/) 74. The tilt controller 70 may be incorporated in the base station 64 if convenient, instead of being located separately as illustrated. It may be in a location remote from the base station 64 and antenna assembly 62.

The antenna assembly 62 has a first pair of ports A(+) and B(+) for positive polarisation transmit signals relayed by respective feeders of the first feeder pair 72. It has a second pair of ports A(−) and B(−) for negative polarisation transmit signals relayed by respective feeders of the second feeder pair 74. It also incorporates two signal combining networks (not shown, as disclosed in the prior art) for forming vectorial combinations of pairs of signals of like polarisation (i.e. pairs A(+)/B(+) and A(−)/B(−)) to provide respective drive signals for individual antenna dipoles such as 63a/63b in the two vertical, mutually orthogonal arrays of dipoles which make up the crossed dipole antenna stack 63: i.e. one signal combining network receives positive polarisation transmit signals from the first pair of ports A(+) and B(+) and develops from them respective drive signals for positive polarisation antenna dipoles such as 63a, and these dipoles produce a positive polarisation transmit beam 76a. The other signal combining network receives negative polarisation transmit signals from the second pair of ports A(−) and B(−) and develops from them respective drive signals for negative polarisation antenna dipoles such as 63b, and these dipoles produce a negative polarisation transmit beam 76b with (as illustrated) a different vertical angle of electrical tilt to beam 76a.

The antenna system 60 operates in reverse in receive mode. Receive signals appearing in positive and negative polarisation receive beams 76c and 76d with different vertical angles of electrical tilt are received by respective vertical arrays of like-polarised dipoles making up the crossed dipole antenna stack 63. They are converted by the signal combining networks into pairs of signals of like polarisation (i.e. pairs A(+)/B(+) and A(−)/B(−)) which pass to the tilt controller 70 for conversion into individual positive and negative polarisation receive signals for receipt by the CDMA base station 64. In a similar manner to the embodiment described with reference to FIG. 3, the antenna system 60 is suitable for cellular mobile radio systems using CDMA as will be described later. Each of the four beams 76a to 76b has a respective vertical angle of electrical tilt (and hence also terrain coverage) which is variable in response to the tilt controller 70 changing the phase difference between signals on a feeder pair 72 or 74.

The antenna system 60 uses phase difference between a pair of feeders to vary the angle of electrical tilt, but the concept is extendable to control of the angle of electrical tilt on the basis of phase difference between three or more feeders with a further increase in the angle over which the antenna assembly 62 can be tilted.

The antenna systems 30 and 60 of the invention described with reference to FIGS. 3 and 4 exhibit advantages for radio communications, they:

1. provide a number of beams in the vertical plane using a single antenna stack with antenna elements connected either to a single corporate feed network for one polarisation or to two corporate feed networks for two polarisations, the corporate feed network(s) being within an antenna assembly which incorporates the antenna stack;

2. improve antenna coverage so that the traffic capacity of an antenna site can be increased and directed to a specific geographical area according to that area's traffic requirement;
3. improve up-link communications performance by segregating users into areas associated with individual beams thereby reducing system self-interference; and
4. enable advantages 1 to 3 above to be shared between a number of operators using non-contiguous frequencies (as hereinafter defined).

Advantages 1. to 3. above are obtained without significantly increasing the antenna system's visual intrusion into the environment. Furthermore, the antenna system 60 provides each beam 76a etc. with an independent, and (if required) remotely adjustable, angle of electrical tilt.

Figure 5:
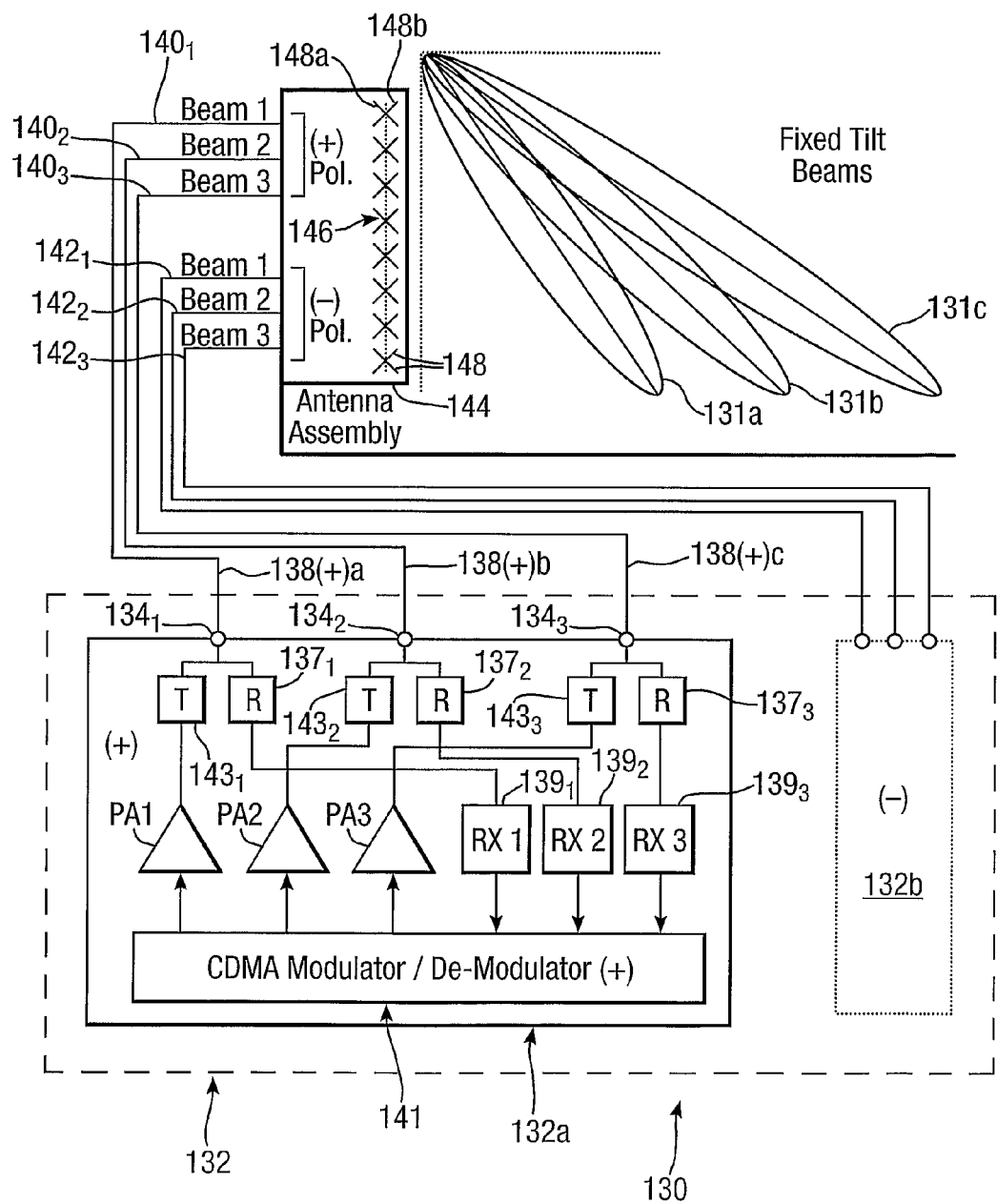
FIG. 5 illustrates an embodiment of the invention providing multiple beams for a single operator.

Referring now to FIG. 5, a further fixed tilt antenna system 130 of the invention is shown which is equivalent to the embodiment 30 of the invention described with reference to FIG. 3 with N=3, i.e. it provides three respective beams 131a to 131c with different vertical angles of electrical tilt for each of positive and negative polarisation signals, the beams being useable in transmit and receive modes. Parts (other than the beams) equivalent to those described earlier are like referenced with a prefix 100.

The antenna system 130 incorporates a CDMA base station 132 indicated within chain lines. The base station 132 has a first part 132a shown in some detail, and a second part 132b shown as a dotted line box only. The first part 132a is for positive polarisation signals: the second part 132b is for negative polarisation signals and is of like construction to the first part 132a.

The first part 132a has three ports $134_1$ to $134_3$ connected to positive polarisation antenna ports $140_1$ to $140_3$. In receive mode, receive signals from regions covered by the beams 131a to 131c pass respectively from the antenna ports $140_1$ to $140_3$ via links 138(+)a to 138(+)c to filters $137_1$ to $137_3$ (boxes "R") in the base station 132 and thence to receiver filters $139_1$ to $139_3$ (boxes "RX1" to "RX3") for input to a CDMA modulator/de-modulator 141. In transmit mode, transmit signals pass from the CDMA modulator/de-modulator 141 to power amplifiers PA1, PA2 and PA3, and thence to transmit filters $143_1$ to $143_3$ (boxes "T") after which they are duplexed on to the links 138(+)a to 138(+)c respectively in each case. The transmit signals pass via the links 138(+)a to 138(+)c to the antenna ports $140_1$ to $140_3$ for transmission in the beams 131a to 131c respectively.

The second part 132b is constructed and operates in the same way as the first part 132a, except that it deals with negative polarisation transmit and receive signals passing via antenna ports $142_1$ to $142_N$. It will not be described further.

The antenna system 130 may be modified to use separate base stations having respective receivers and power amplifiers. For example, three base stations might each have one respective power amplifier equivalent to power amplifier PA1, PA2 or PA3 and one respective receiver equivalent to receiver $139_1$ (RX1), $139_2$ (RX2) or $139_3$ (RX3).

Figure 6:
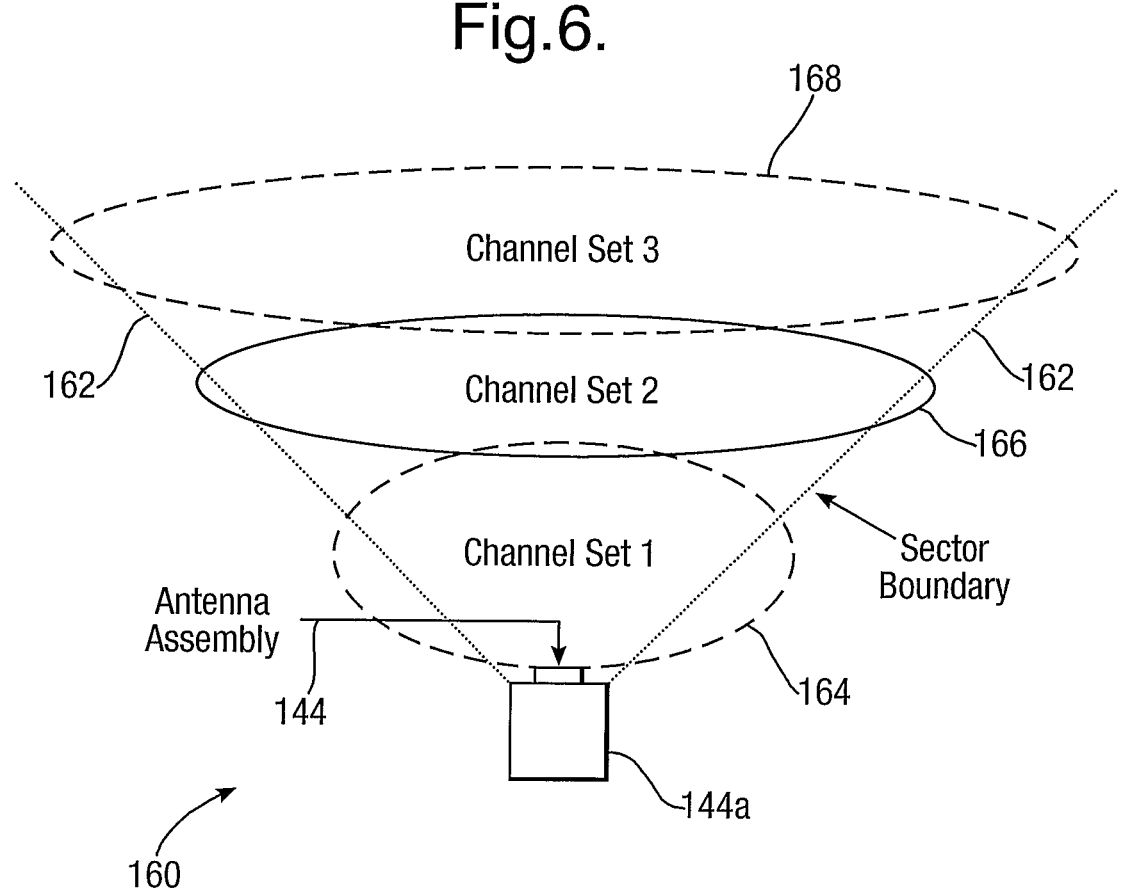
FIGS. 6 and 7 are schematic drawings indicating geographical sector coverage pattern generated by an embodiment of the invention.

Referring now to FIG. 6, a typical sector coverage pattern indicated generally by 160 is illustrated for a geographical sector 90 degrees in horizontal extent between dotted lines 162. This drawing is schematic only, in practice the situation is more complex in the field strength pattern than is illustrated: the major axis of each ellipse shown with be aligned at constant radius from the antenna 144 (see FIG. 5). The pattern 160 is of a kind which might be generated by the antenna assembly 144 and mounted upon a support 144a, albeit it might be distributed differently if required. Respective beams (not shown, see 131a to 131c in FIG. 5) generate a near field ground coverage area 164, an intermediate field ground coverage area 166 and a far field ground coverage area 168. The areas 164 to 168 define cells for cellular radio, and are associated with different sets of communications channels, channel sets 1 to 3, in a manner to be described in more detail later.

Figure 7:
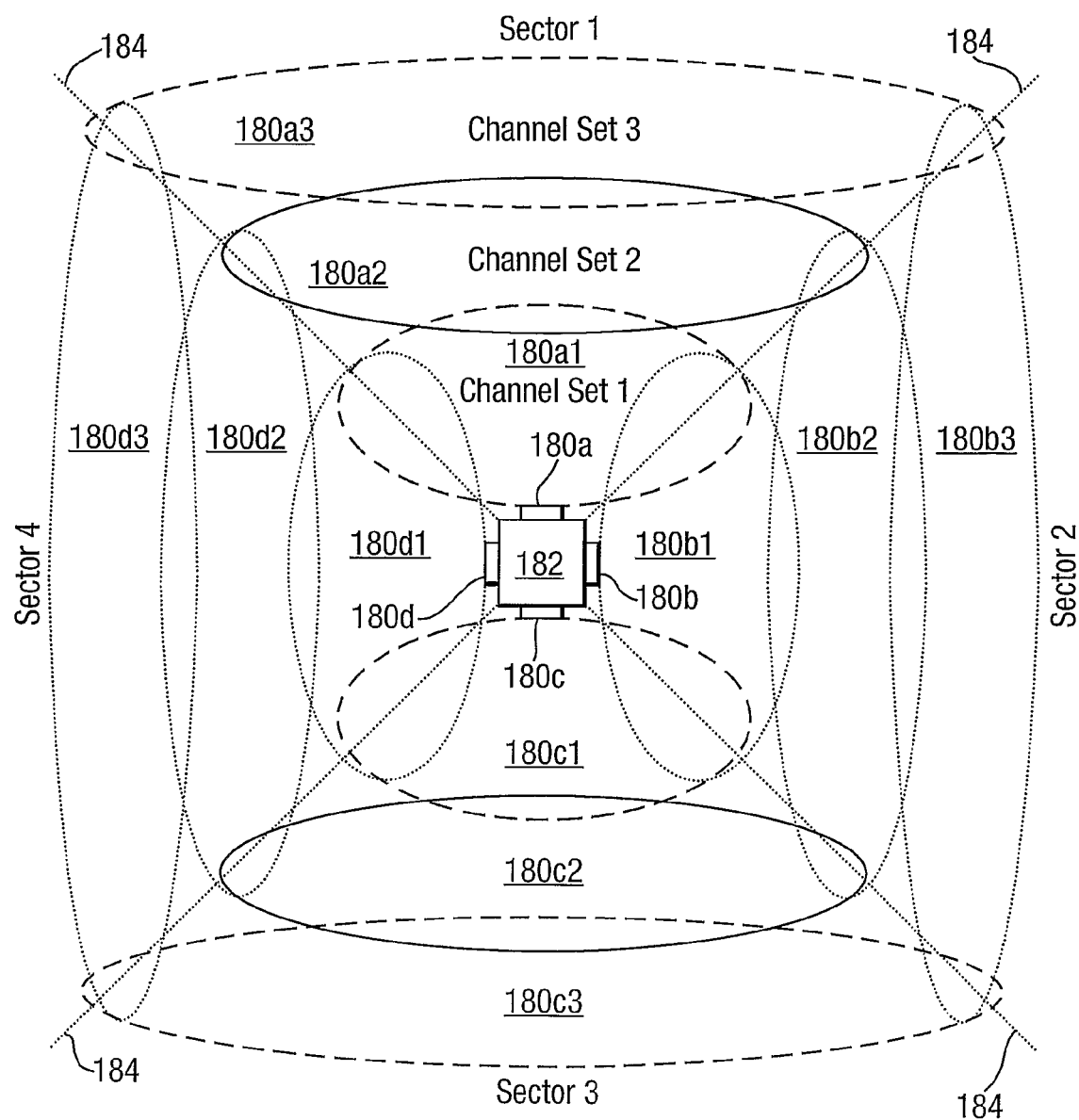

FIG. 7 shows the embodiment 160 replicated to provide four 90 degree sectors giving geographical coverage 360 degrees in horizontal extent. There are now four antenna assemblies 180a to 180d mounted on a common support 182 (e.g. an antenna mast) and communicating with respective 90 degree sectors, i.e. sectors 1 to 4 defined between pairs of dotted lines 184. The antenna assemblies 180a to 180d give rise to respective sets of three ground coverage areas or cells 180a1 to 180a3, 180b1 to 180b3, 180c1 to 180c3 and 180d1 to 180d3.

Figure 8:
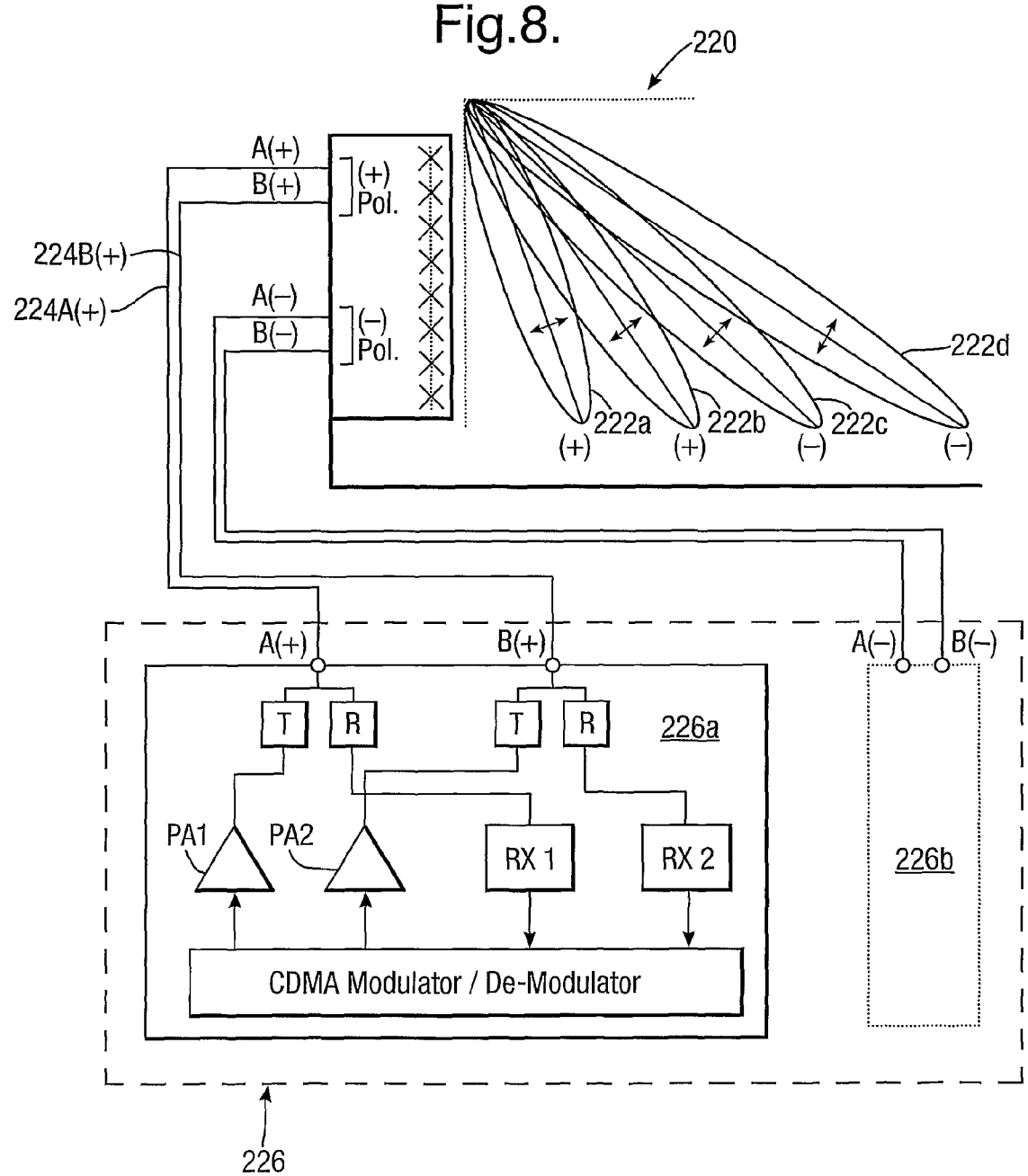
FIG. 8 illustrates an embodiment of the invention providing multiple beams for a single operator and a base station with phase controlled ports.

FIG. 8 shows an antenna system 220 of the invention for provision of beams 222a and 222b with positive polarisation and beams 222c and 222d with negative polarisation. It is equivalent to the embodiment 60 described with reference to FIG. 4 in which the angle of electrical tilt for each beam is set by adjusting a phase difference between signals e.g. A (+) and B(+) on two feeders 224A(+) and 224B(+); more details of contents of a base station 226 are shown as for base station 132 in FIG. 5 but with fewer transmit filters T, receive filters R, power amplifiers PA1, PA2 and receivers, RX1, RX2. Electrical tilt control is implemented in this embodiment but is not shown in the drawing: it will be described later. This embodiment operates in accordance with the relevant parts of the descriptions of embodiments 60 and 130 and will not be described in detail.

Duplex filters T, R in a first base station part 226a separate positive polarisation transmit and receive signal paths so that they may be connected to the transmit and receive ports of the base station 226. The base station 226 has two power amplifiers PA1 and PA2 so that a respective power amplifier may be used for each beam intended for use with transmit signals. It also has two receivers RX1 and RX2 so that a respective receiver may be used for each beam intended for receive signals. Similar processing arrangements are made for negative polarisation signals associated with a second base station part 226b indicated by dotted lines and containing circuit elements as in the first base station part 226a.

Figure 9:
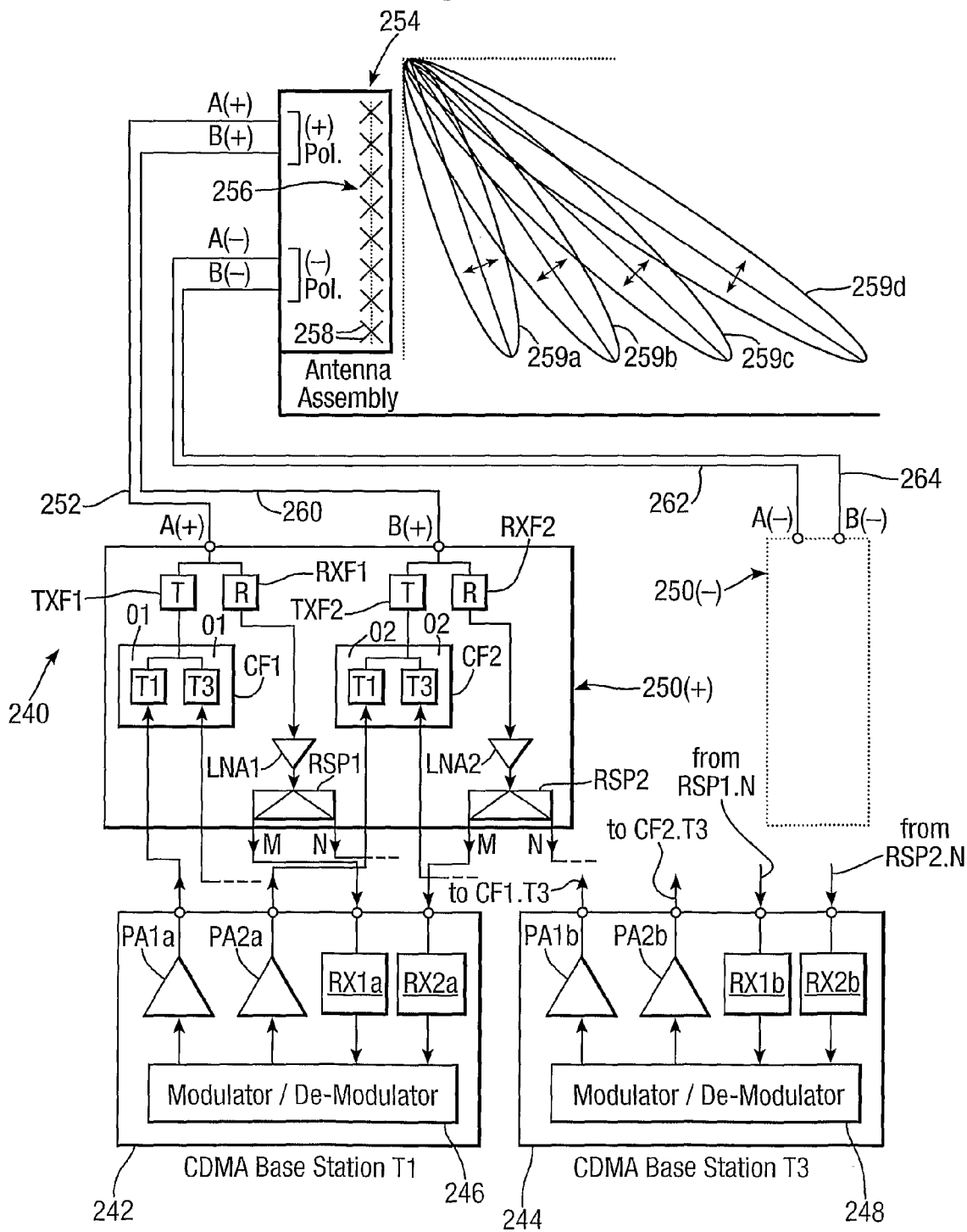
FIG. 9 shows a modified version of the embodiment of the invention illustrated in FIG. 8 for use by multiple operators.

FIG. 9 shows an embodiment 240 of the invention suitable for use by multiple base station operators sharing the same antenna, using different non-contiguous frequency bands and generating multiple beams. It is equivalent to the embodiment 220 of the invention described with reference to FIG. 8 except that it is adapted for use by a plurality of operators.

The embodiment 240 has first and second CDMA base stations 242 and 244 operating on non-contiguous frequency bands T1 and T3 respectively; the expression "non-contiguous" means T1 and T3 are sufficiently far apart to be separated by filters with frequency cut-off characteristics which do not overlap significantly and which are realisable in practice (contiguous frequency bands can also be accommodated with modification as will be described later). As illustrated the base stations 242 and 244 are equipped for positive polarisation signals only, but their features are replicated (not shown) for negative polarisation signals as indicated by a dotted box 250(−).

The first CDMA base station 242 has a CDMA modulator/de-modulator 246, first and second power amplifiers PA1a and PA2a and first and second receivers RX1a and RX2a. The second CDMA base station 244 is likewise equipped with a CDMA modulator/de-modulator 248, first and second power amplifiers PA1b and PA2b and first and second receivers RX1b and RX2b.

The embodiment 240 has a first transmit combiner/receive splitter unit 250(+) for positive polarisation signals: this unit has first and second combining filters CF1 and CF2, first band pass transmit and receive filters TXF1 and RXF1, and second band pass transmit and receive filters TXF2 and RXF2. The combining filters CF1 and CF2 each contain two narrow band pass isolating filters centred on and labelled by frequencies T1 and T3. The unit 250 also has first and second low noise amplifiers LNA1 and LNA2 connected to respective receive signal splitters RSP1 and RSP2 each with outputs M and N.

The first and second power amplifiers PA1a and PA2a in the first base station 242 are connected to the T1 narrow band pass isolating filters in the combining filters CF1 and CF2 respectively. The M outputs of the receive signal splitters RSP1 and RSP2 are connected to the first base station's first and second receivers RX1a and RX2a respectively.

To avoid an excess of overlapping connections, those between the second CDMA base station 244 and the first transmit combiner/receive splitter unit 250(+) are not shown. However, the first and second power amplifiers PA1b and PA2b in the second base station 244 are connected to the T3 narrow band pass isolating filters in the combining filters CF1 and CF2 respectively. The N outputs of the receive signal splitters RSP1 and RSP2 are connected to the second base station's first and second receivers RX1b and RX2b respectively.

The T1 and T3 narrow band pass isolating filters in the first combining filter CF1 have outputs O1 which are connected together to the first band pass transmit filter TXF1. Likewise, the T1 and T3 narrow band pass isolating filters in the second combining filter CF2 have outputs O2 which are connected together to the second band pass transmit filter TXF2.

The first band pass transmit and receive filters TXF1 and RXF1 are connected together by a first common link 252 to a first positive polarisation port A(+) of an antenna assembly 254 including an array 256 of crossed dipoles such as 258 generating beams 259a to 259d. Likewise, the second band pass transmit and receive filters TXF2 and RXF2 are connected together by a second common link 260 to a second positive polarisation port B(+) of the antenna assembly 254.

The antenna assembly 254 also has first and second negative polarisation ports A(−) and B(−) likewise connected via respective links 262 and 264 to a second transmit combiner/receive splitter unit 250(−) for negative polarisation signals and indicated by dotted lines: this splitter unit 250(−) has filters, low noise amplifiers and receive signal splitters (not shown) equivalent to and connected in a like manner to those of the first transmit combiner/receive splitter unit 250(+). It is connected to components (not shown) of the base stations 242 and 244 associated with negative polarisation signals (i.e. replicated equivalents of those shown for positive polarisation signals).

The embodiment 240 operates equivalently to the embodiment 220 of the invention described with reference to FIG. 8, except that signals associated with both base stations 242 and 244 at respective frequencies T1 and T3 are combined on to each of the four links 252, 26, 262 and 264. In transmit mode, the T1 and T3 narrow band pass isolating filters in the combining filters CF1 and CF2 isolate each base station 242 or 244 from the other's transmit frequency, with like remarks applying to elements of the second transmit combiner/receive splitter unit 250(−). In receive mode, the base station's receivers RX1a to RX2b distinguish their frequencies in a known manner. Each base station operator therefore has access to the beams 259a to 259d of the antenna assembly 254 in transmit and receive mode and positive and negative polarisation.

The embodiment 240 may be adapted to include additional non-contiguous frequencies T5, T7 etc. from associated base stations by adding additional narrow band pass isolating filters to the combining filters CF1 etc. It may also be adapted for operation with contiguous frequencies numbered in succession T1, T2, T3, T4 etc. which cannot be separated adequately by conventional filters: the frequencies are divided into non-contiguous groups containing separable frequencies, i.e. an odd numbered group T1, T3 and an even numbered group T2, T4. Each group is then fed to a respective set of antenna ports, so the antenna assembly 254 requires an additional set of antenna ports for the even numbered frequency group T2, T4.

The two frequency groups T1/T3 and T2/T4 are combined on transmission from the antenna assembly—"air combining"—as described in WO 02/0082581.

Figure 10:
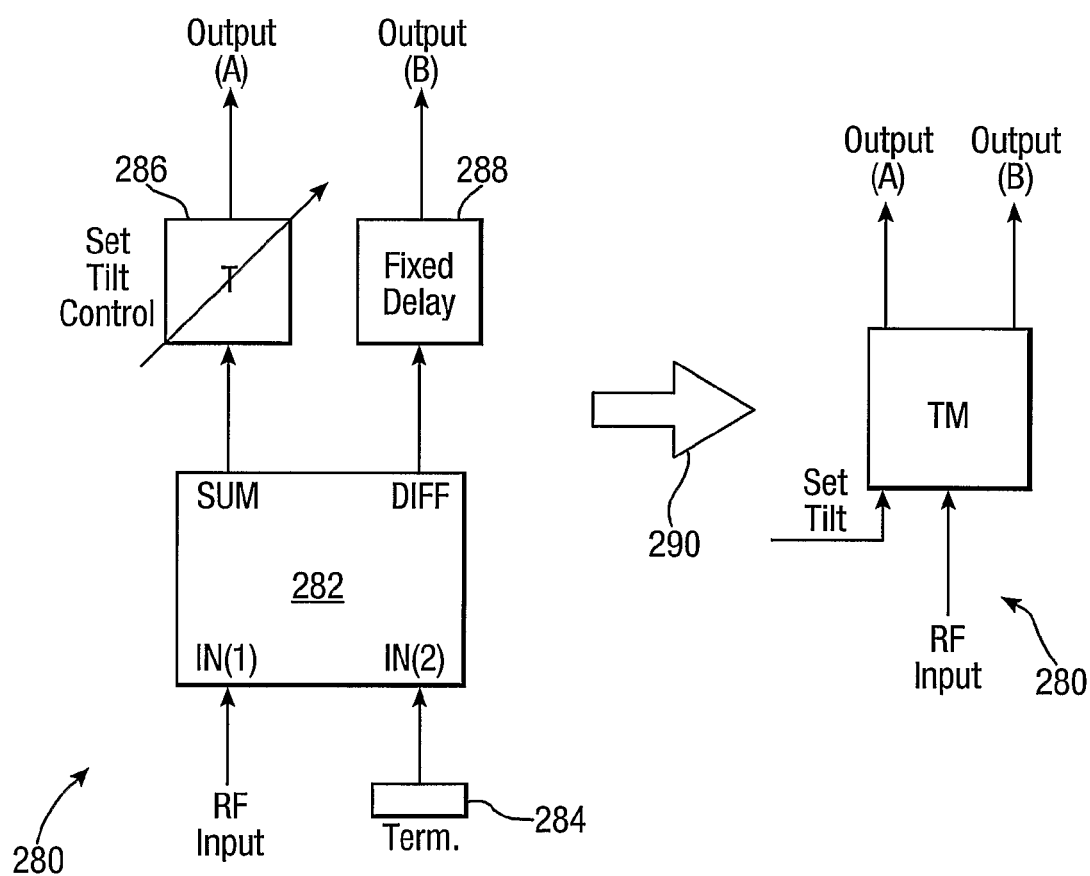
FIG. 10 is a schematic drawing of a tilt module for control of electrical beam tilt.

Referring now to FIG. 10, on the left of the drawing an electronic tilt module 280 is shown which is used in embodiments to be described later. The module 280 for tilting an antenna beam incorporates a 180 degree hybrid coupler ("hybrid") 282 having an RF input IN(1) and a second input IN(2) terminated by a matched load 284. The hybrid 282 has two outputs SUM and DIFF connected to a variable delay 286 providing a set tilt control and a fixed delay 288, which are in turn connected to outputs (A) and (B) respectively.

The hybrid 282 splits an RF input transmit signal at IN(1) into two output signals which appear at outputs SUM and DIFF respectively. One of these output signals is delayed by the variable delay 286, which is adjusted to provide an appropriate delay as required to tilt an antenna beam. Conveniently, the other output signal undergoes a fixed delay at 288 equal to one-half of the maximum delay of the variable delay 286. If the variable delay 286 provides a maximum time delay of 2D, the fixed delay 288 provides a delay of D, enabling a signal at output (A) to be varied from +D to −D relative to a signal at output (B), where a negative delay corresponds to a phase advance. The sign of the delay determines the direction of tilt—up or down—of an antenna beam. The module 280 therefore enables an antenna transmit beam to be tilted both up and down from an untilted position by adjustment of the set tilt control 286.

The module 280 also operates in reverse as a signal combiner: it receives two input receive signals at what are now inputs SUM and DIFF, and generates a single receive output at IN(1). This enables an antenna receive beam to be tilted both up and down from its un-tilted beam angle by adjustment of the set tilt control 286. As indicated by an arrow 290, the module 280 may be represented in simplified form as on the right of the drawing, and this representation will be used later.

Figure 11:
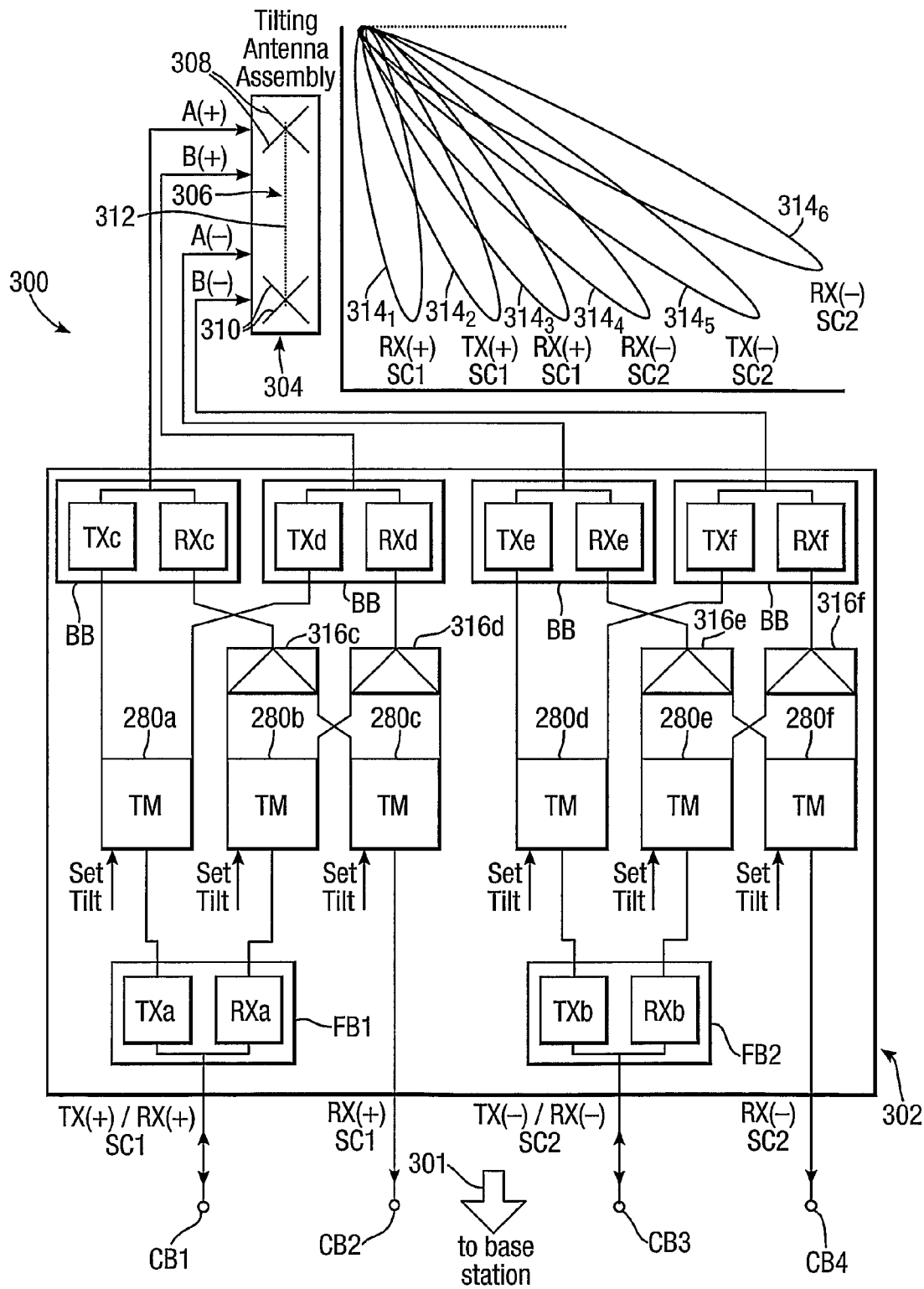
FIG. 11 illustrates an embodiment of the invention providing multiple tiltable transmit and receive beams in two polarisations associated with different scrambling codes.

Referring now to FIG. 11, a further antenna system embodiment 300 of the invention is shown which provides multiple antenna beams and beam tilt control external to a base station (see tilt controller 70 in FIG. 4). It incorporates a tilt controller 302 which receives coded communications from a base station (not shown), generates signals in relatively delayed pairs and supplies them to an antenna assembly 304. The antenna assembly 304 incorporates a vertical array 306 of crossed dipoles, of which upper and lower crossed dipoles are shown at 308 and 310 and intervening crossed dipoles (not shown) are implied by a dotted line 312. It generates six antenna beams $314_1$ to $314_6$, of which beams $314_1$ to $314_3$ are associated with positive polarisation (+), beams $314_4$ to $314_6$ are associated with negative polarisation (−), beams $314_1$, $314_3$, $314_4$ and $314_6$ are associated with receive signals and beams $314_2$ and $314_5$ are associated with transmit signals.

The embodiment 300 is used with a CDMA base station (not shown, located as indicated by arrow 301) which transmits and receives signals with positive and negative polarisations, i.e. four signals in total, TX(+), TX(−), RX(+), RX(−).

The tilt controller 302 has four input/output terminals below, CB1, CB2, CB3 and CB4. The first terminal CB1 receives input of TX(+) and provides output of RX(+), the second terminal CB2 provides output of RX(+), the third terminal CB3 receives input of TX(−) and provides output of RX(−) and the fourth terminal CB4 provides output of RX(−). However, at first and second terminals CB1 and CB2, signals TX(+)/RX(+) and RX(+) are encoded with a first scrambling code SC1, whereas at third and fourth terminals CB3 and CB4, signals TX(−)/RX(−) and RX(−) are encoded with a second scrambling code SC2. As will be described later, scrambling codes identify or distinguish different cells from one another. As indicated in the drawing, three of the antenna beams, i.e. beams $314_1$ to $314_3$, are encoded with the first scrambling code SC1, and the other three beams, i.e. beams $314_4$ to $314_6$, are encoded with the second scrambling code SC2.

The first and third terminals CB1 and CB3 are connected to respective first and second filter banks FB1 and FB2 each containing a transmit/receive filter pair TXa/RXa, TXb/RXb. First and second filter bank transmit filters TXa and TXb are connected to first and fourth tilt controllers 280a and 280d respectively. Likewise, first and second filter bank receive filters RXa and RXb are connected to second and fifth tilt controllers 280b and 280e respectively. Third and sixth tilt controllers 280c and 280f are connected to second and fourth terminals CB2 and CB4 respectively. The first tilt controller 280a provides input to first and second output transmit filters TXc and TXd, and the fourth tilt controller 280d provides input to third and fourth output transmit filters TXe and TXf.

The tilt controller 302 has first, second, third and fourth input receive filters RXc, RXd, RXe and RXf which accept receive signals from the antenna assembly 304 and filter them for output to respective first, second, third and fourth splitters 316c, 316d, 316e and 316f. The first and second splitters 316c and 316d each provide inputs to both the second and third tilt controllers 280b and 280c. The third and fourth splitters 316e and 316f each provide inputs to both the fifth and sixth tilt controllers 280e and 280f.

The output transmit filters TXc to TXf and the input receive filters RXc to RXf are grouped as indicated by boxes BB into first, second, third and fourth transmit/receive filter pairs TXc/RXc, TXd/RXd, TXe/RXe and TXf/RXf connected to ports A(+), B(+), A(−) and B(−) of the antenna assembly 304 respectively.

By inspection of the drawing, each of the tilt controllers 280a to 280f provides a pair of transmit signals to or receives a pair of receive signals from either antenna ports A(+) and B(+) or antenna ports A(−) and B(−). Thus first and fourth tilt controllers 280a and 280d provide transmit signals to antenna ports A(+)/B(+) and A(−)/B(−) respectively. Second and third tilt controllers 280b and 280c both obtain receive signals from antenna ports A(+) and B(+), and fifth and sixth tilt controllers 280e and 280f both obtain receive signals from antenna ports A(−) and B(−). Thus each of the tilt controllers 280a to 280e provides a variable relative delay either between two output signals split from one input signal (transmit mode) or between two input signals which are then combined to provide one output signal (receive mode).

As in the embodiment 60 described with reference to FIG. 4, and as disclosed in the prior art of WO 2004/102739 and WO 2005/048401, an antenna beam angle of electrical tilt is adjustable by introducing a difference in phase between signals applied to ports A(+) and B(+) or ports A(−) and B(−). The antenna assembly 304 incorporates two signal combining networks (not shown, as disclosed in the prior art): these networks form vectorial combinations of pairs of signals of like polarisation (i.e. pairs on ports A(+)/B(+) or A(−)/B(−)) to provide antenna dipole drive signals, and the resulting beams $314_1$ to $314_6$ have independently variable electrical tilt by altering the "Set Tilt" delay indicated for each corresponding tilt controller 280a to 280f in the drawing and shown at 286 in FIG. 10.

The embodiment 300 has two transmit beams $314_2$ and $314_5$ and four receive beams $314_1$, $314_3$, $314_4$ and $314_6$: this is because it has two tilt controllers 280a and 280d associated with transmit beams and four tilt controllers 280b, 280c, 280e and 280f associated with receive beams. All of the beams $314_1$ to $314_6$ have tilts which are adjustable independently of one another, and may be all different as shown. Additional receive beams may be added to either polarisation by further splitting receive signals and adding additional tilt modules.

Figure 12:
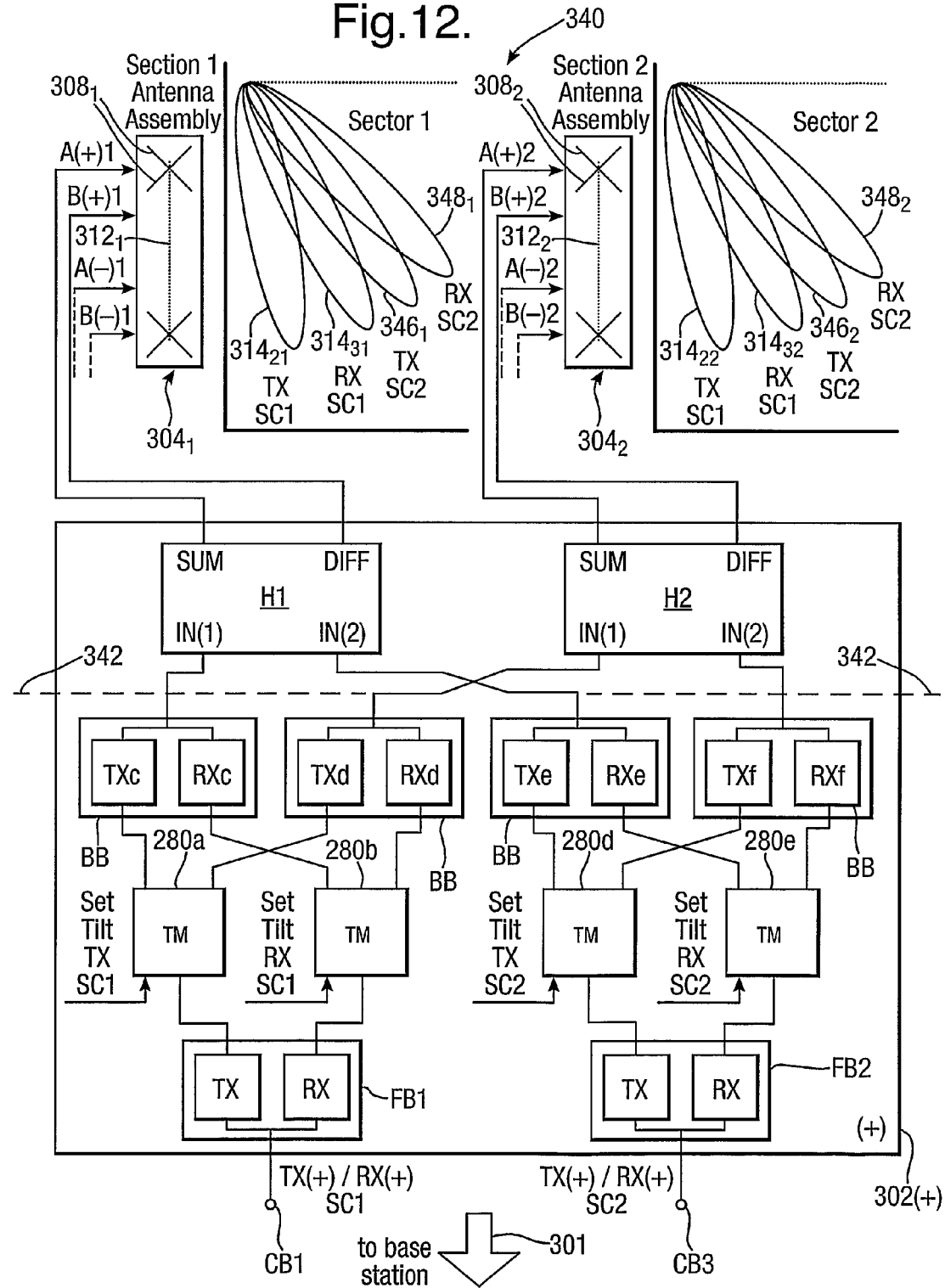
FIG. 12 illustrates an embodiment of the invention providing two geographical sectors with multiple tiltable transmit and receive beams and different scrambling codes.

Referring now to FIG. 12, a further embodiment 340 of the invention is shown which provides multiple antenna beams and external beam tilt control combined with capability for accommodating multiple geographical sectors. It is a modified version of the embodiment 300 described with reference to FIG. 11, equivalent features are like referenced, and its description will be directed to aspects of difference. The drawing shows only circuitry (other than antenna inputs) for positive polarisation signals, but the circuitry may be replicated to add negative polarisation signals.

The embodiment 340 incorporates a tilt controller 302(+) for positive polarisation signals. Below a chain line 342, the tilt controller 302(+) is equivalent to the tilt controller 302 of the embodiment 60 with connection of tilt modules 280b and 280e direct to receive filters RXc/RXd and RXe/RXf respectively, together with removal of inputs CB2 and CB4, splitters 316c to 316f and tilt modules 280c and 280f. As before, tilt modules 280a and 280d provide inputs to output transmit filters TXc/TXd and TXe/TXf respectively.

At both its terminals CB1 and CB3, the tilt controller 302(+) receives input of positive polarisation transmit signals TX(+) and provides output of positive polarisation receive signals RX(+). However, at first terminal CB1, signals TX(+)/RX(+) or sets of 256 channels are encoded with first scrambling code SC1, whereas at second terminal CB3, signals TX(+)/RX(+) are encoded with second scrambling code SC2.

A change from the earlier embodiment is that first and second transmit/receive filter pairs TXc/RXc and TXd/RXd are connected to first and second inputs IN(1) and IN(2) of a first hybrid H1, and third and fourth transmit/receive filter pairs TXe/RXe and TXf/RXf are connected to first and second inputs IN(1) and IN(2) of a second hybrid H2. The first hybrid H1 has sum and difference outputs SUM, DIFF connected to positive polarisation ports A(+)1 and B(+)1 of a Sector 1 antenna assembly $308_1$, and the second hybrid H2 has sum and difference outputs SUM, DIFF connected to positive polarisation ports A(+)2 and B(+)2 of a Sector 2 antenna assembly $308_2$. The Sector 1 and Sector 2 antenna assemblies $308_2$ and $308_1$ provide communications for first and second geographical sectors respectively. They have negative polarisation ports A(−)1/B(−)1, A(−)2/B(−)2 for connection to a negative polarisation equivalent (not shown) of tilt controller 302(+).

In transmit mode, positive polarisation, the embodiment 340 operates as follows: transmit signals from the base station encoded with scrambling codes SC1 and SC2 are relatively delayed at tilt controllers 280a and 280d, then combined by hybrids H1 and H2, each of which outputs the sum and difference of the signals at its inputs IN(1) and IN(2). The positive polarisation ports A(+)1/B(+)1, A(+)2/B(+)2 of the Sector 1 and Sector 2 antenna assemblies $308_1$ and $308_2$ each receive a pair of transmit signals with variable relative delay imposed by tilt module 280a or 280d, the transmit signals being encoded with scrambling codes SC1 and SC2 respectively. Signal combining networks in these antenna assemblies convert the transmit signals into antenna element drive signals with appropriate relative phase for beam tilting. These antenna assemblies therefore both produce two transmit beams $314_{21}/346_1$, $314_{22}/346_2$ with different scrambling codes SC1 and SC2: the beams have tilts which are adjustable independently of one another using tilt modules 280a and 280d, and may be different as shown.

In receive mode, positive polarisation, the embodiment 340 operates in reverse. Receive signals appearing in positive polarisation receive beams $314_{31}/348_1$, $314_{32}/348_2$ are received by Sector 1 and Sector 2 antenna assemblies $308_1$ and $308_2$. They are converted by the signal combining networks into pairs of signals A(+)/B(+) of like polarisation which pass to the tilt controller 302(+) for combining by hybrids H1 and H2, filtering at RXc to RXf, relative phase adjustment using tilt modules 280b and 280e for beam tilt control, and filtering at FB1 and FB2. The hybrids H1 and H2 operate equivalently in reverse, receive signals input at SUM and DIFF being converted into sum and difference signals at what are now outputs IN(1) and IN(2). The Sector 1 and Sector 2 antenna assemblies $308_1$ and $308_2$ therefore convert receive signals appearing in positive polarisation receive beams $314_{31}/348_1$, $314_{32}/348_2$ into receive signals with different scrambling codes SC1 and SC2 for output at terminals CB1 and CB3 respectively to the base station.

With a second tilt controller equivalent to tilt controller 302(+), the embodiment 340 would generate another four beams in each of the Sectors 1 and 2 for negative polarisation transmit and receive signals providing polarisation diversity. Each of the Sector 1 and Sector 2 antenna assemblies $308_1$ and $308_2$ may (optionally) have a group tilt facility whereby the electrical tilt of its beams are off-set to a preset degree.

Figure 13:
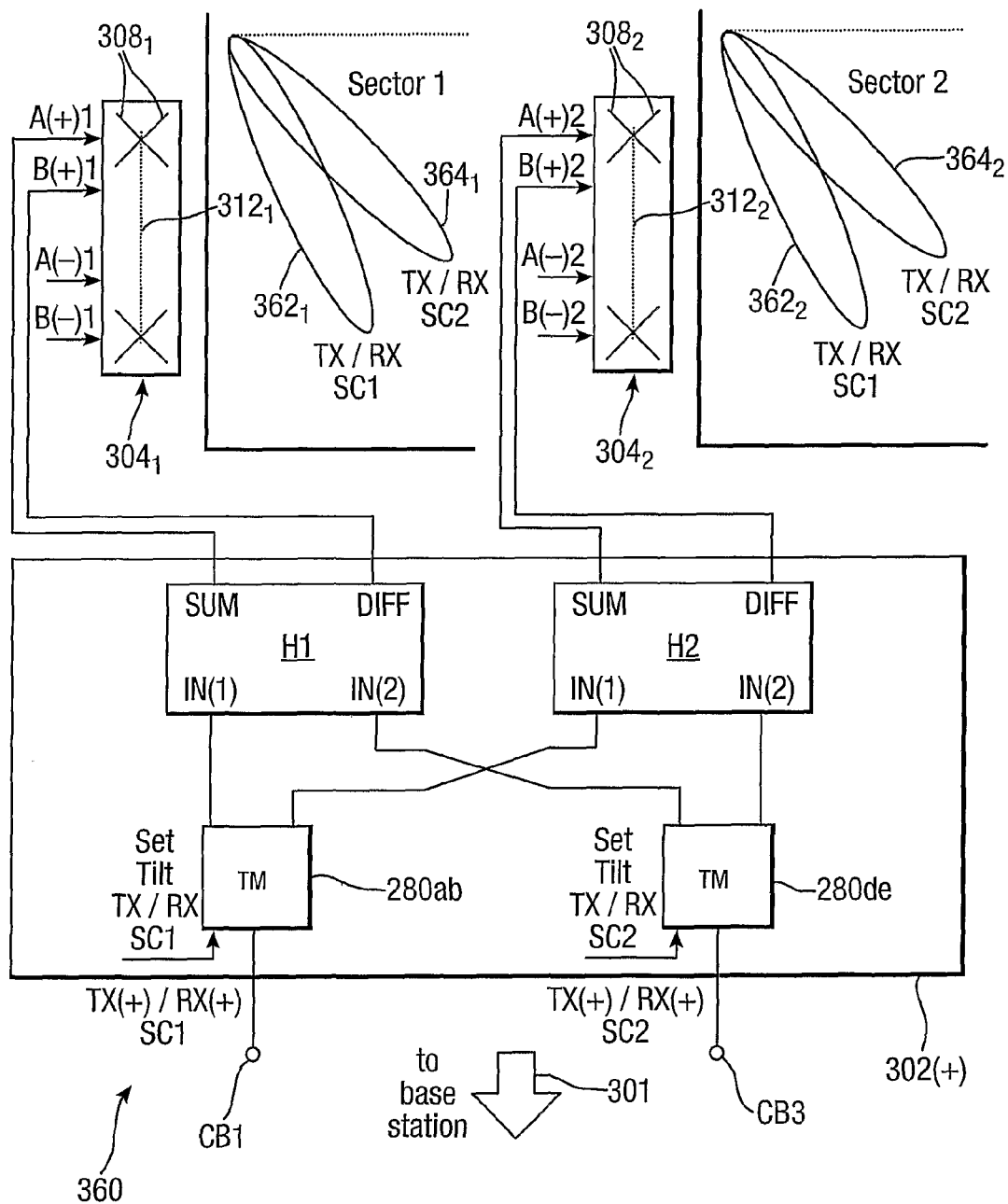
FIG. 13 illustrates a simplified version of the FIG. 12 embodiment.

Referring now to FIG. 13, a further embodiment 360 of the invention is shown which is a simplified version of the embodiment 340 described with reference to FIG. 12. Features equivalent to those described earlier are like referenced. The embodiment 360 is for use when transmit and receive beams have a common angle of electrical tilt. Its description will be directed to the changes made to the earlier embodiment and their consequences.

Because transmit and receive beams have a common angle of electrical tilt, the embodiment 360 does not require filter banks FB1 and FB2 to separate transmit and receive signals, or filters TXc/RXc etc. to combine them. It only requires two tilt modules 280ab and 280de instead of four, each module tilting both a transmit beam and a receive beam and each module being associated with a respective scrambling code SC1 or SC2.

In Sector 1, the embodiment 360 produces TX/RX beams $362_1$ and $364_1$ associated with scrambling codes SC1 and SC2 respectively, and in Sector 2, it produces TX/RX beams $362_2$ and $364_2$ likewise associated.

Figure 14:
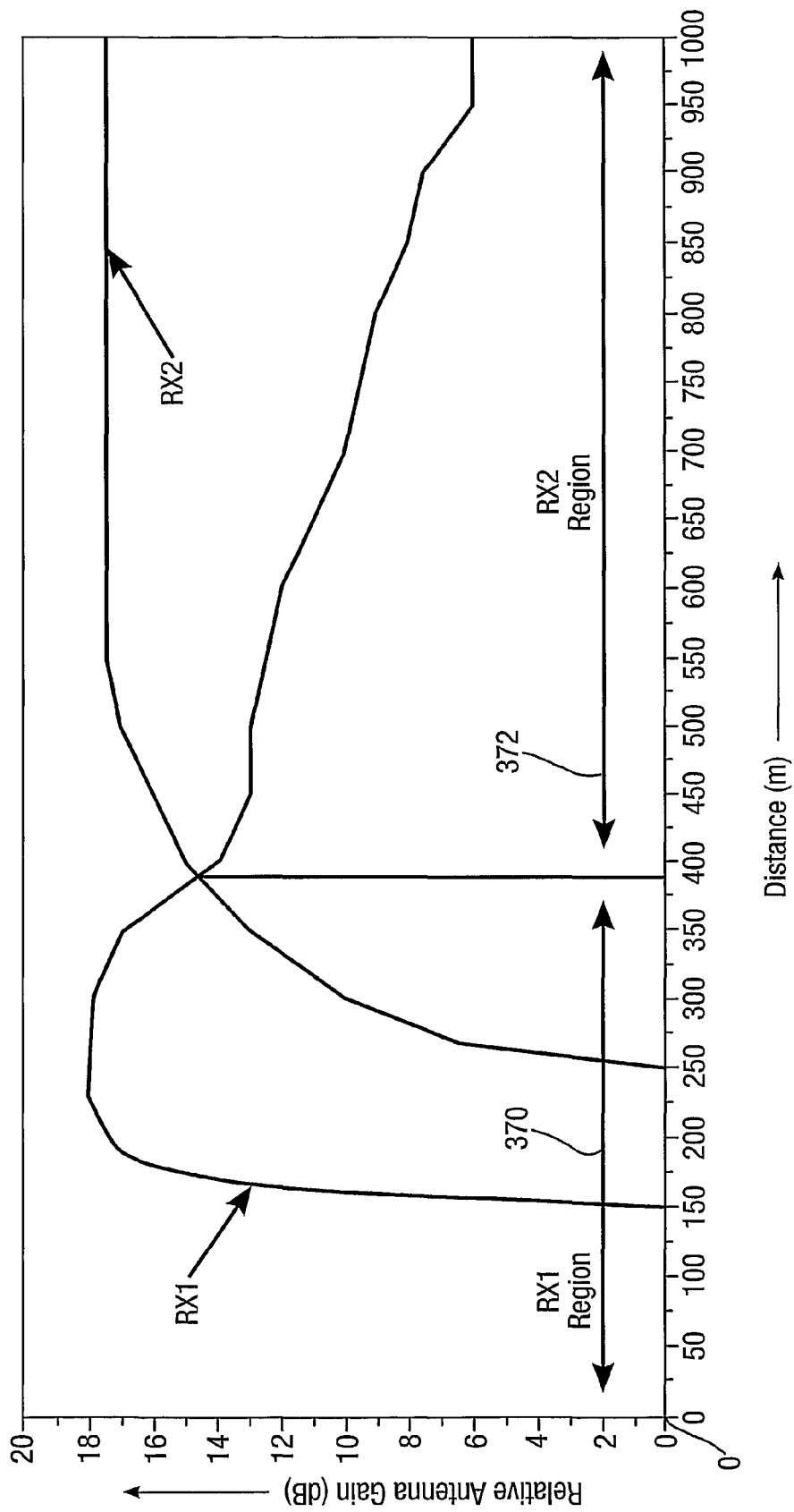
FIG. 14 illustrates a communications advantage obtainable with an embodiment of the invention.

The benefit provided by embodiments of the invention as regards up-link communications (receive mode) will now be described with reference to FIG. 14, which illustrates the theoretical difference in path loss attributable to a vertical radiation pattern of a 17 dBi antenna with height of 30 m as a function of distance. Here "i" in dBi means relative to an isotropic radiator. Antenna gain is plotted in dB against distance in metres from the antenna considered to be at an origin O in the drawing.

The drawing has two graphs RX1 and RX2 corresponding to first and second antenna beams respectively and referred to below accordingly. The first beam RX1 has a down tilt of 6.0 degrees and provides input to a first base station receiver (not shown). The second beam RX2 has an up-tilt of 1.0 degrees and provides input to a second base station receiver (not shown).

The first and second beams RX1 and RX2 may be orthogonal to one another in that a cellular mobile radio transmitting a signal which is directed along the boresight of the first beam RX1 does not cause a signal in the base station receiver connected to the second beam RX2.

A first region indicated by an arrow 370 extends from the antenna location at the origin to a distance of 390 m. In part of the first region from O to 150 m the path loss is small. In the rest of the first region from 150 m to 390 m the path loss is increasing but the antenna beam used for RX1 is at, or near, its maximum, and typically 14 dBi to 18 dBi. Thus a cellular radio handset and a base station communicating with one another may reduce their transmitted power whilst retaining adequate communications performance.

In a second region indicated by an arrow 372 extending from 390 m to a cell boundary at 1,000 m, the second beam RX2 provides a path loss advantage that increases with distance as the effective antenna gain increases to its maximum value of 18 dBi as the distance from the base station increases.

Consequently, in a high density user environment the up-link communications performance is improved due to a higher effective antenna gain and reduced interference from other mobiles due to the segregation of users. Similar benefits are obtained in down-link communications.

The use of coding in telecommunications will now be described in more detail. The Universal Mobile Telecommunications System (UMTS) is defined by the $3^{rd}$ Generation Partnership Project (3GPP) and uses Wideband Code Division Multiple Access (WCDMA) as a multiple user access scheme.

UMTS has an air-interface down-link channel in which logical user-orientated data streams or "logical channels" are processed through a number of stages. Logical channels may be time multiplexed with other logical channels and include encryption, compression and assembly of data into frames to produce "transport channels". These transport channels are then subsequently processed by adding frame error detection overhead, adding frame error correction (FEC) coding, performing inter-frame and intra-frame interleaving, multiplexing of control data, and finally bit rate adaptation to create physical channels. Processing of logical channels to obtain physical channels is known and will not be described further.

UMTS has a number of physical channel types, one such being a "dedicated physical channel" (DPCH): DPCH is a processed data channel type which generally carries 3G-service content or information intended for at least one unique mobile radio user. It has all necessary coding and processing included for delivery over a mobile radio channel. It is able to support a wide range of information data rates, and also supports fast power control and handover over functions through embedded control data. There can be many DPCHs on a UMTS down-link, depending upon what mixture of services, users and data rates is involved.

Other physical channels also exist which are intended to support simultaneous delivery of content to multiple users (broadcast/multi-cast services), or which are specifically designed to deliver high rate "bursty" data, e.g. delivery of interactive web based content. Finally, there are "common" physical channels which are not derived from high layer processes, and exist for control purposes (as opposed to messages), i.e. mobile user synchronisation, cell acquisition, cell selection, reporting, handover, and the broadcast of other network parameter information which mobile terminals require to function in the UMTS network.

Figure 15:
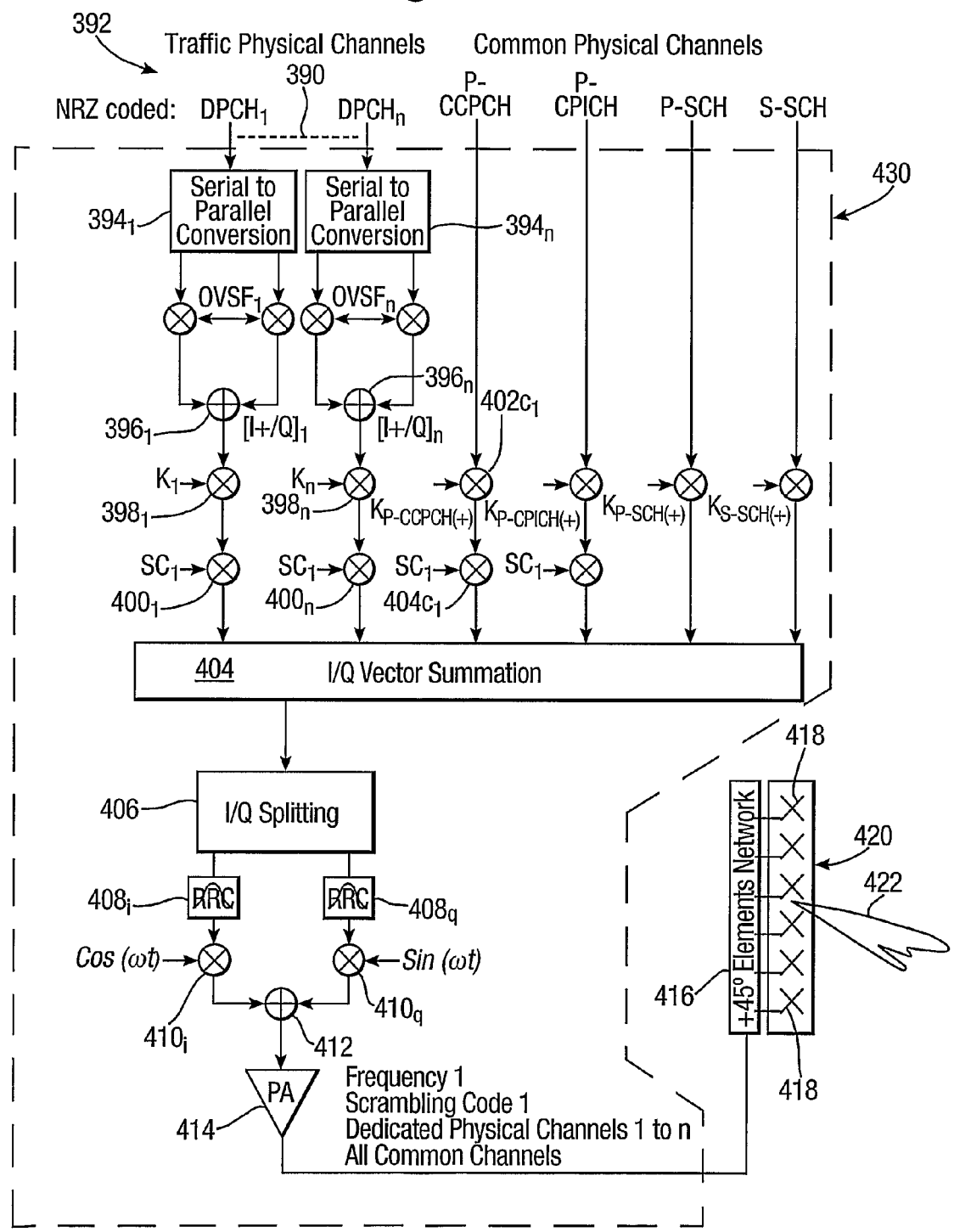
FIG. 15 is a schematic drawing of part of a UMTS air-interface down-link channel.

FIG. 15 gives an example of typical UMTS down-link physical channel processing: it illustrates final stages of signal processing in a UMTS down-link channel, i.e. performing the CDMA function, from physical channels to RF modulation and transmission. To reduce illustrational complexity, FIG. 15 shows only n dedicated (or traffic) physical channels $DPCH_1$ to $DPCH_n$ (n is a positive integer) of which two $DPCH_1$ and $DPCH_n$ are shown and others are implied by a dotted line 390; also shown are some common physical channels, P-CCPCH, P-CPICH, P-SCH and S-SCH. Here "traffic" refers to message traffic.

DPCH physical channels bits are initially non-return to zero (NRZ) coded at 392, and each dedicated physical channel $DPCH_1$ to $DPCH_n$ undergoes a serial to parallel conversion at $394_1$ to $394_n$: i.e. pairs of bits are converted to complex number representations referred to as data symbols. The data symbols are each modulo-2 multiplied at $OVSF_1$ to $OVSF_n$ by respective orthogonal variable spreading factor (OVSF) codes, also known as channelisation codes and having a code rate of 3.84M chips per second (Mcps, $M=10^6$). OVSF codes are orthogonal to each other, and perform a code division process in WCDMA/UMTS. They can support multiple access delivery of different DPCH information rates. Systems other than UMTS may use other types of channelisation code, e.g. cdma2000 uses Walsh codes.

In phase and quadrature parts of data symbols $[I+jQ]_1$ to $[I+jQ]_n$ are combined at $394_1$ to $394_n$ respectively, which provides n channelisation-coded physical channels with a symbol rate of 3.84 Msymbols per second. The n channelisation-coded physical channels are multiplied by scalars $K_1$ to $K_n$ at $398_1$ to $398_n$ respectively to perform amplitude or power control of their data. They are then multiplied at $400_1$ to $400_n$ by a common scrambling code SC1 having a chip rate of 3.84 Mcps to render them doubly encoded. Scrambling codes are specific examples of cell identifying codes.

Common physical channels are likewise multiplied by scalars, and some of them (left hand pair only) are multiplied by the common scrambling code SC1: e.g. a first common physical channel P-CCPCH is multiplied by scalar $K_{P-CCPCH}$ at $402c_1$ and by the common scrambling code SC1 at $404c_1$.

All the channelisation-coded, scramble-coded physical channels and common physical channels are then (complex number) summed by a summer 404. This produces a single symbol rate of 3.84 Msymbols per second, representing all physical channels multiplexed together and ready for transmission.

Conventionally all the channelisation-coded physical channels are multiplied by the same scrambling code at $400_1$ to $400_n$, and this could be carried out after the summing function 404 to reduce the number of multiplication operations required. However, 3GPP specification scrambling codes can be applied individually to channelisation-coded physical channels, and this is convenient for the purposes of embodiments of the invention described below.

Symbols resulting from summation at 404 are split into in-phase and quadrature (I and Q) components at 406, and filtered by respective pulse shaping filters 408$i$ and 408$q$ each with a raised root cosine (RRC) impulse function characteristic. After this filtering, they are I/Q modulated at 410$i$ and 410$q$ on to an UMTS RF carrier, combined at 412 and sent to an RF power amplifier stage 414. They pass from the RF power amplifier stage 414 to a corporate feed network 416 supplying a crossed (orthogonal) dipole antenna stack 420 having antenna dipoles (only 6 shown) such as 418 of like negative 45 degree polarisation indicated by "−45°"; they are radiated by the antenna stack 420 as a beam 422. The RRC pulse shaping filters 408$i$ and 408$q$ ensure out of band emissions are kept to a minimum in the RF domain.

The beam 422 now contains an RF carrier (i.e. single frequency) with channelisation-coded physical channels encoded with the common scrambling code SC1 and common physical channels some of which are encoded with that scrambling code. For the purposes of description of subsequent embodiments an encoding unit 430 is defined by a chain line which encompasses apparatus shown in the drawing other than the antenna stack 420.

Scrambling codes are associated with a cell or sector in a cellular network. There can be a number of cells generated from an operator's cell-site; e.g. three antennas arranged at the same height on a cell-site but pointing in different azimuthal directions create three cells. Every cell on the same site and all surrounding sites have different scrambling codes, and all cells are designed to be on the same RF Carrier frequency. In UMTS there are 512 valid primary scrambling codes, and hence scrambling codes are re-used across a network at sufficient separation distances as not to cause co-code interference or ambiguity.

Scrambling codes are not perfectly orthogonal to one another, but instead have low cross-correlation characteristics (i.e. they are near orthogonal), but they also have a consistently low cross-correlation for all time shifts of the codes. The absence of perfect orthogonality means interference will exist at baseband in a mobile receiver due to reception of other non-serving cells in the network using different scrambling codes. However, the interference generated will be low and predictable as a mobile terminal moves around and hence experiencing different time shifts of different scrambling coded signals against the desired cell's signal. In short, there are no usable families of codes which exhibit orthogonality against each other for all time delays.

Figure 16:
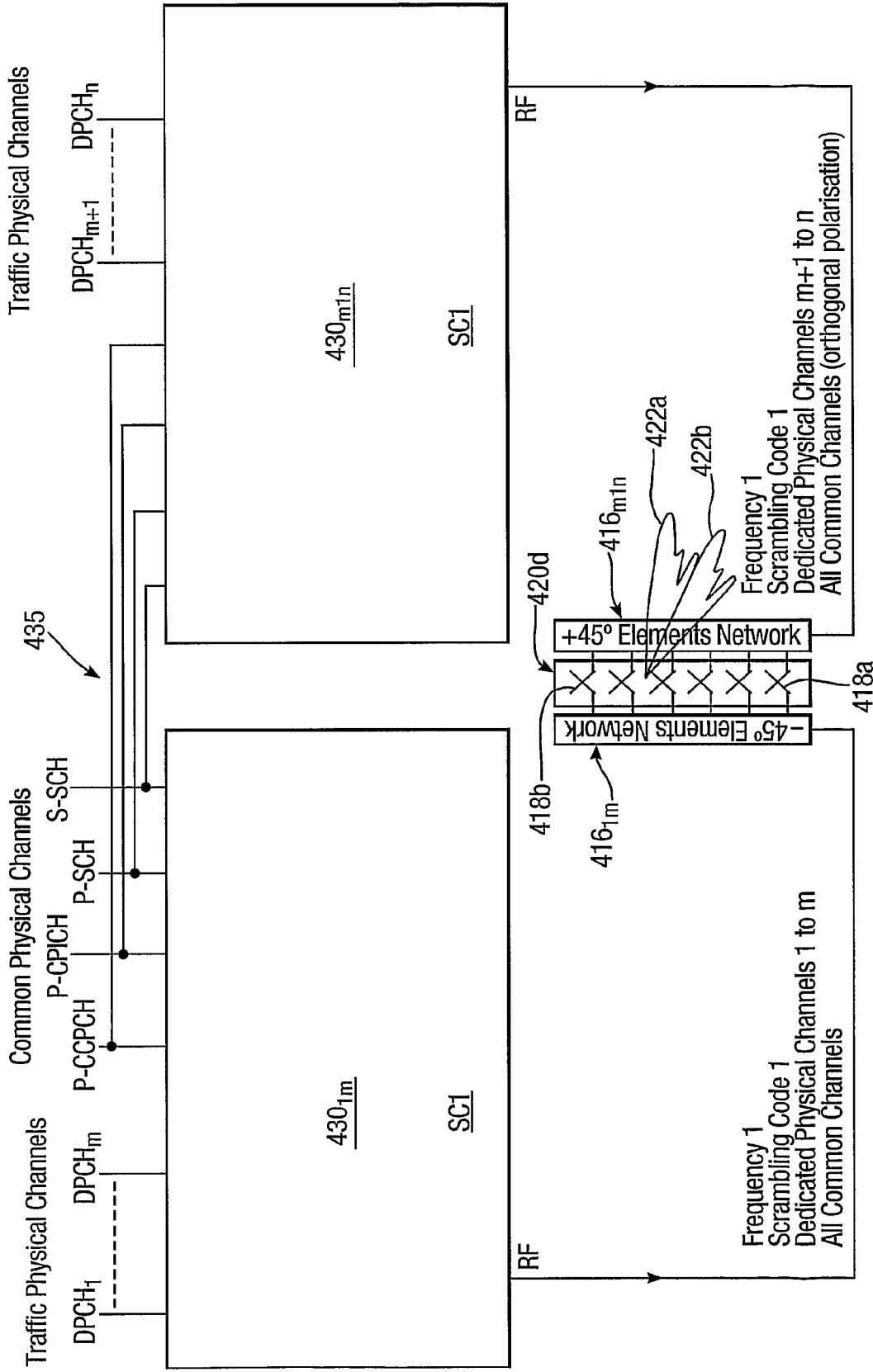
FIG. 16 illustrates another embodiment of the invention implementing what is referred to herein as "channel code division tilt"

Referring now to FIG. 16, a further embodiment 435 of the invention implements a concept referred to herein as "channel code division tilt". It is equivalent to two encoding units 430 described with reference to FIG. 15 and associated with respective polarisations of a dual orthogonal polarisation antenna 420$d$ with crossed dipoles 418$a$ and 418$b$; parts equivalent to those previously described are like referenced.

Dedicated (or traffic) physical channels $DPCH_1$ to $DPCH_n$ are divided (not shown) into first and second subsets $DPCH_1$ to $DPCH_m$ and $DPCH_{m+1}$ to $DPCH_n$ connected to respective encoding units $430_{1m}$ and $430_{m1n}$ each using the same scrambling code SC1 for cell encoding purposes. The same common physical channels P-CCPCH, P-CPICH, P-SCH and S-SCH are connected to both encoding units $430_{1m}$ and $430_{m1n}$. RF outputs from the encoding units $430_{1m}$ and $430_{m1n}$ are connected to respective antenna corporate feed networks $416_{1m}$ and $416_{m1n}$; one corporate feed network $416_{1m}$ supplies a first set of antenna dipoles such as 418$a$ of negative polarisation inclined at −45 degrees to the vertical as indicated by "−45°", and the other corporate feed network $416_{m1n}$ supplies a second set of antenna dipoles such as 418$b$ of positive polarisation inclined at +45 degrees to the vertical as indicated by "+45°": these two sets of antenna dipoles are therefore orthogonal to one another.

The antenna stack 420 radiates a first beam 422$a$ from antenna dipoles such as 418$a$ of one polarisation, and a second beam 422$b$ from antenna dipoles such as 418$b$ of the other polarisation, these beams having different vertical angles of electrical tilt. The beams 422a and 422b both contain the same RF carrier frequency with channelisation-coded dedicated (or traffic) physical channels further encoded with the same scrambling code SC1. They also contain the same common physical channels some of which are encoded with scrambling code SC1. However, of the dedicated (or traffic) physical channels, the first beam 422a contains only those in the first subset $DPCH_1$ to $DPCH_m$ and $DPCH_{m+1}$ to $DPCH_n$, and the second beam 422a contains only those in the second subset $DPCH_{m+1}$ to $DPCH_n$. The dedicated (or traffic) physical channels $DPCH_1$ to $DPCH_n$ have therefore been divided between the first and second beams 422a and 422b having different vertical angles of electrical tilt, hence the expression "channel code division tilt" referred to above.

Because both beams 422a and 422b have the same scrambling code SC1, one cell is generated across both of them, but each beam does not have as high a transmission power requirement than a beam carrying all n dedicated (or traffic) physical channels $DPCH_1$ to $DPCH_n$, since it delivers only a respective subset of those physical channels. This arrangement has the advantage of injecting less power toward neighbouring cell sites in a CDMA network, which in turn means less CDMA inter-cell interference and more capacity accommodated in the network.

It is possible to have additional coding units 430 associated with additional beams 422 by further sub-dividing the dedicated (or traffic) physical channels $DPCH_1$ to $DPCH_n$. The logical conclusion of this technique is to have multiple beams, one for each Traffic DPCH, but this would consume OVSF resources available to each DPCH. Having only two or three subsets of dedicated (or traffic) physical channels $DPCH_1$ to $DPCH_n$ offers a sensible compromise in reducing inter-cell interference power, yet would not greatly limit choices of OVSF resources for DPCH channels.

The embodiment 435 provides an advantage in reduction of what is known as "crest factor". In this connection, a WCDMA waveform has a high ratio of peak power to average power, and this ratio is known as the waveform crest factor. In the UMTS system the crest factor depends on the number of channels in use and can rise to 11 dB. Furthermore, the crest factor increases as more waveforms are added together for sharing purposes.

High crest factor causes a number of problems for a WCDMA system. Power efficiency for an antenna installation is defined as a ratio of RF output power to DC input power: it is low and typically 5%, which results in high running costs for the installation. Power amplifiers are subject to a linearity requirement which is increased, and to meet this requirement results in reduced amplifier bandwidth.

Allocation of different subsets of physical channels $DPCH_1$ to $DPCH_m$ and $DPCH_{m+1}$ to $DPCH_n$ to different antenna beams 422a and 422b reduces the crest factor of the waveform. Halving the number of physical channels in an aggregate waveform reduces the crest factor by 3 dB. In the limit when there are 256 beams, each with its own power amplifier, the crest factor reduces to that of a sine wave, namely, 3 dB. The waveform then has a constant envelope and the requirement for amplifier linearity is a minimum. Furthermore, each beam can have its average power level controlled in order to meet the traffic, and geographical, requirement of its coverage area.

Figure 17:
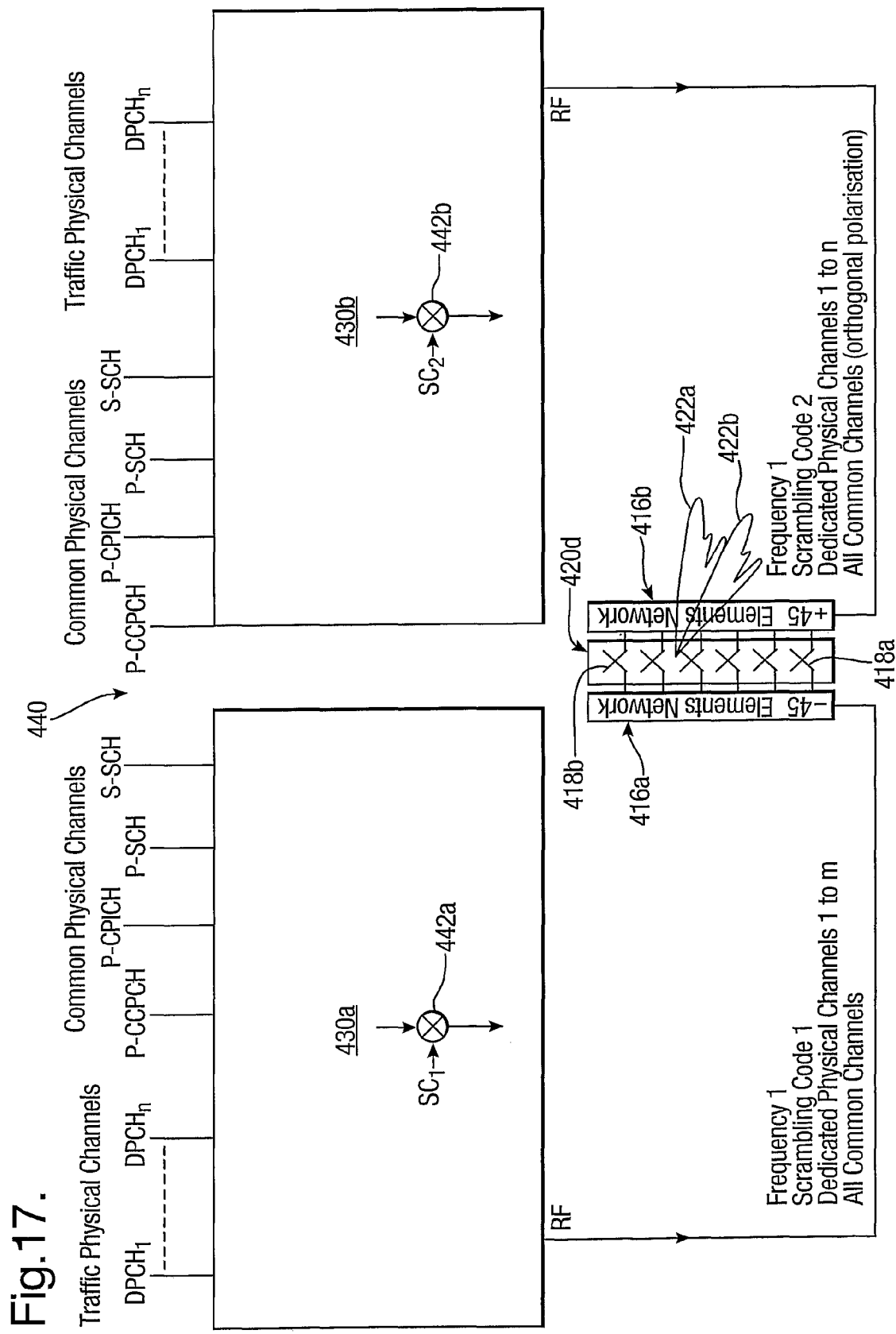
FIG. 17 is a schematic drawing of a further embodiment of the invention implementing what is referred to herein as "cell code division tilt"

Referring now to FIG. 17, a further antenna system 440 of the invention is shown which employs another coding technique referred to herein as "cell code division tilt". It is adapted from the embodiment 435 described with reference to FIG. 16, and parts equivalent to those previously described are like referenced (ignoring suffixes n, a etc.). Description will concentrate on aspects of difference.

Dedicated (or traffic) physical channels $DPCH_1$ to $DPCH_n$ and common physical channels P-CCPCH, P-CPICH, P-SCH and S-SCH are connected to both encoding units 430a and 430b, i.e. all n dedicated (or traffic) physical channels to each. The encoding units 430a and 430b are equivalent except that they use different scrambling codes SC1 and SC2 for cell encoding purposes, as indicated at 442a and 442b respectively. Two beams 422a and 422b with different electrical tilts are again generated from one antenna assembly 420. However, the first beam 422a contains only channelisation-coded dedicated (or traffic) physical channels further encoded with the first scrambling code SC1, and the second beam 422b contains only channelisation-coded dedicated (or traffic) physical channels further encoded with the second scrambling code SC2. In consequence, because the beams 422a and 422b have different scrambling codes they are associated with different cells.

Traffic which would normally be served using a conventional one-tilt or one-cell sector antenna is now split in the embodiment 440 across two tilt angles serving traffic further away from the antenna location for the first beam 422a than for the second beam 422b. This makes it possible to reduce power in the second beam 422b; moreover, serving farther out traffic involves injecting less power towards neighbouring cell sites in a CDMA network, which in turn means less CDMA inter-cell interference and more capacity is accommodated in the network.

It is possible for the embodiment 440 to have additional beams 422 associated with additional coding units 430 using respective further scrambling codes SC3 etc.

In order to implement the embodiment 440, power transfer between channels should be less than 30 dB. This can be achieved by using one or more techniques such as:
1. orthogonal polarisations of a dual-polarised antenna array,
2. orthogonal beams which can be created by the same array of elements, and
3. a mixture of both polarisation orthogonality and multibeam orthogonality.

Figure 18:
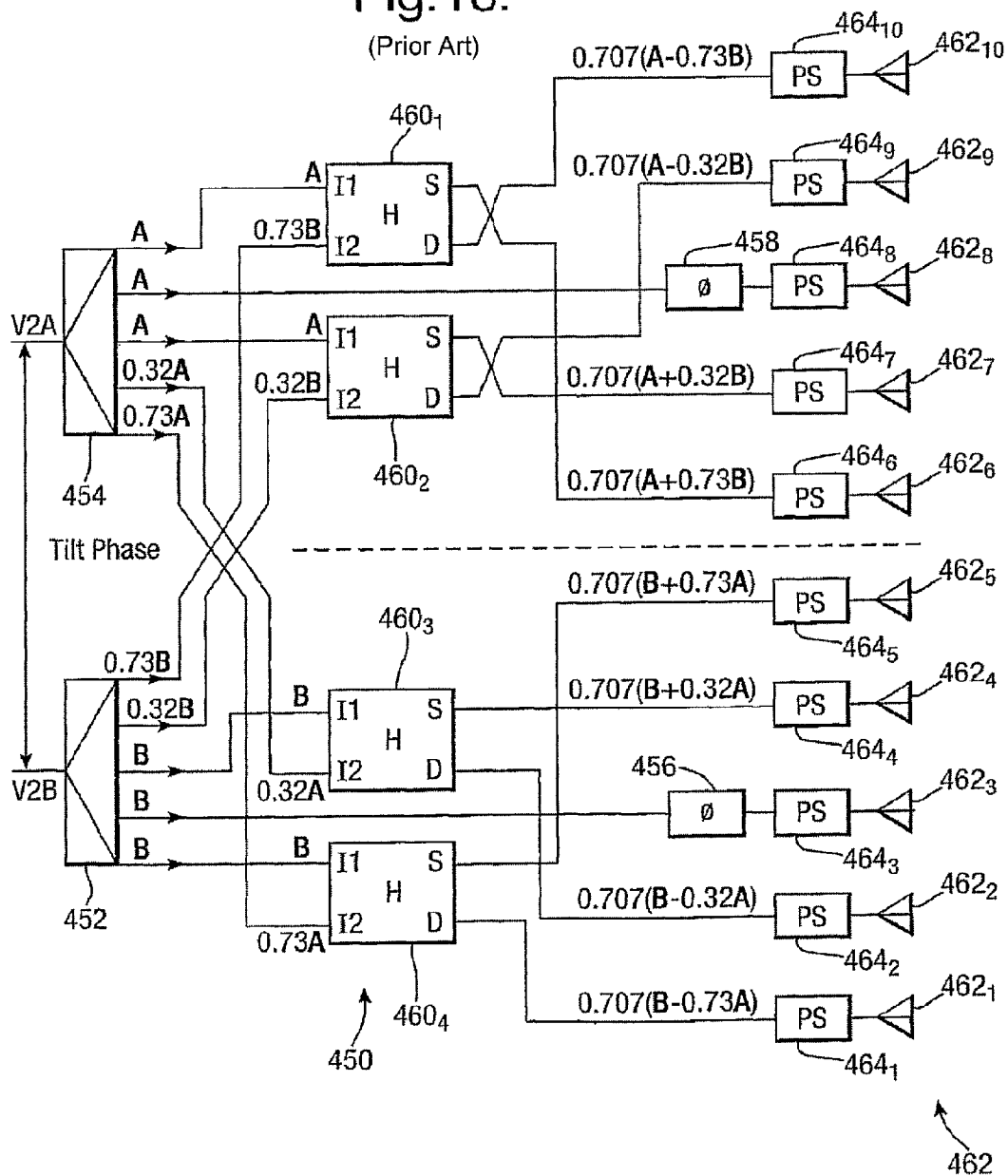
FIG. 18 shows a network for control of antenna electrical tilt in response to variation of a phase difference between two signals.

Referring now to FIG. 18, a signal splitting and recombining network 450 of known kind (see WO 2004/102739) provides control of electrical tilt of an antenna in response to variation of a phase difference between two input signals. The network 450 is for use with a phased array 462 of ten antenna elements $462_1$ to $462_{10}$. Splitters 452 and 454 receive respective input signals V2B and V2A (designated as vectors A and B) of equal power. One of the input signals V2B and V2A has passed through a variable delay or variable phase shifter (not shown), and so is delayed relative to the other to a degree which is variable and under the control of an operator. The splitters 452 and 454 each split their respective inputs into five signals, three of which are of the same amplitude (A or B), and the other two are 0.32 and 0.73 of that amplitude (0.32 or 0.73 of A or B).

The splitters 452 and 454 consequently produce ten signals, eight of which pass to four vector combining devices $460_1$ to $460_4$: each of these devices is a 180 degree hybrid (marked H) having two input terminals designated I1 and I2 and two output terminals designated S and D for sum and difference respectively. On receipt of input signals at its terminals I1 and I2, each of the hybrids $460_1$ to $460_4$ produces two output signals at S and D which are the vector sum and difference of its respective input signals. Table 1 below shows the input signal amplitudes received by the hybrids $460_1$ to $60_4$ and the output signals in vector form generated in response, expressed in terms of arbitrary vectors A and B in each case.

TABLE 1

| Hybrid | I1 Input | I2 Input | S Output | D Output |
|---|---|---|---|---|
| $460_1$ | A | 0.73B | 0.707(A + 0.73B) | 0.707(A − 0.73B) |
| $460_2$ | A | 0.32B | 0.707(A + 0.32B) | 0.707(A − 0.32B) |
| $460_3$ | B | 0.32A | 0.707(B + 0.32A) | 0.707(B − 0.32A) |
| $460_4$ | B | 0.73A | 0.707(B + 0.73A) | 0.707(B − 0.73A) |

Table 2 below shows the antenna elements which receive the output signals generated by the splitters 452 and 454 and hybrids $460_1$ to $460_4$ via antenna phase shifters (PS) $464_1$ to $64_{10}$.

TABLE 2

| Antenna Element | Signal Amplitude |
|---|---|
| $462_1$ | 0.707(B − 0.73A) |
| $462_2$ | 0.707(B − 0.32A) |
| $462_3$ | B |
| $462_4$ | 0.707(B + 0.32A) |
| $462_5$ | 0.707(B + 0.73A) |
| $462_6$ | 0.707(A + 0.73B) |
| $462_7$ | 0.707(A + 0.32B) |
| $462_8$ | A |
| $462_9$ | 0.707(A − 0.32B) |
| $462_{10}$ | 0.707(A − 0.73B) |

The antenna element signals shown in Table 2 provide correct phasing for phased array antenna elements to produce a beam, and the electrical tilt of the beam varies as the phase shift between input signals is changed, which changes the angle between, and therefore resultant of, vectors A and B and proportions thereof, e.g. 0.32A and 0.73B.

One signal A or B from each splitter 452 or 454 is not routed to antenna phase shifter $64_3$ or $64_8$ via a hybrid but instead via a phase shifter 456 or 458 applying a phase shift of φ, which is equal to and compensates for that imposed by each of the hybrids $460_1$ to $460_4$. This is known as "padding".

The network 450 may be adapted to control electrical tilt of multiple beams from one antenna stack independently by providing a respective relative delay between signals associated with each beam. It is also possible to use a network which controls antenna element signal phasing in response to three or more input signals (e.g. vectors A, B, C) with two or more phase differences between signal pairs.

Figure 19:
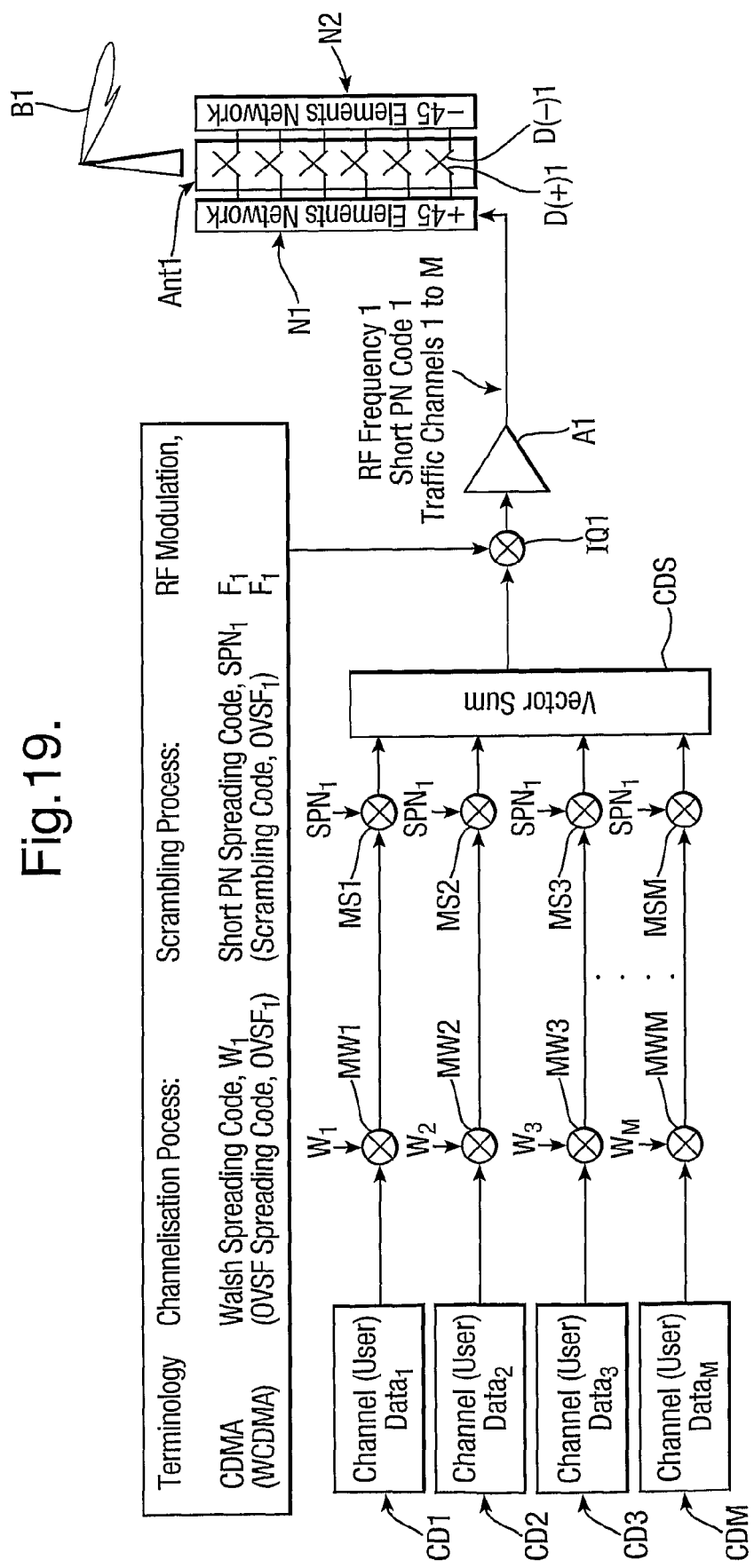
FIG. 19 is a schematic drawing illustrating the use of a channelisation process and a scrambling process in a communications system.

FIG. 19 provides an outline of typical cdma Forward Channel processing, e.g. processing in a base station for transmission to a mobile telephone handset. In the cdma access technique, Forward Channel processing differentiates users, or user data channels, by means of different Orthogonal spreading Codes, commonly referred to as Walsh codes in cdma terminology and as orthogonal variable spreading factor (OVSF) codes in WCDMA terminology. This is referred to as the channelisation process.

The drawing illustrates one group of M user data channels CD1 to CDM (typically 10's of kbps) associated with a single base station (not shown); four data channels CD1 to CD3 and CDM are shown and other data channels CD4 to CDM-1 are indicated by a dotted line. All user data channels are assumed to have been processed with error (channel) coding and interleaving, and framed accordingly; they are then coded as follows: in a first data channel CD1, data has a first Walsh code W1 applied to it at MW1; likewise, in other data channels CD2 to CDM, respective Walsh codes W2 to WM are applied to data at MW2 to MWM respectively. Consequently, each of the user data channels CD1 to CDM is differentiated by having a Walsh code which is different to that of each of the other channels. The Walsh codes run at 1.2288 Mcps and spread user information spectrally, the process being more generally known as Direct Sequence Spread Spectrum (DSSS) coding. Walsh codes are orthogonal to one another when synchronised. Consequently, in a transmitted multiplex of multiple Walsh coded user data, a reverse Walsh de-coding process can extract individual user data without residual interference from other Walsh coded user data.

The channelisation process is followed by what is referred to as the scrambling process. In the scrambling process, spread data resulting from Walsh coding applied in the channelisation process in user data channels CD1 to CDM is then further multiplied at MS1 to MSM respectively by a scrambling code running at 1.2288 Mcps, this being a first scrambling code SPN1 for a first base station. The scrambling code is a short PN (pseudo noise) code which is the same for all M user data channels CD1 to CDM in an individual base station, but differs between different base stations and distinguishes them from one another. A Walsh coded signal is not strictly spread any further in the spectral domain by a scrambling code, but the short PN code scrambling process ensures that the information is spread in a consistent manner, with a flat spectrum, and with a time invariant spectrum due to the code's random temporal properties. Other user data channels at the same base station are processed in the same manner at the same time, using different orthogonal Walsh codes, but the same scrambling code. The resulting multiplex of Walsh coded/short PN coded information is summed at CDS, IQ modulated at IQ1 on to an RF carrier frequency and amplified at A1 for transmission as a single beam B1 from an antenna Ant1.

The antenna Ant1 is a known device consisting of a vertically disposed stack of pairs of crossed dipoles such as D(+)1 and D(−)1, one dipole D(+)1 of each pair being polarised at +45 degrees to the vertical (inclined upwardly to the right), and the other dipole D(−)1 of each pair being polarised at −45 degrees to the vertical (inclined upwardly to the left). The antenna Ant1 has first and second ports (not shown) which are orthogonal to one another, the first port being connected by a first corporate feed network N1 to the stack's +45 degree polarised dipoles only, and the second port being connected by a second corporate feed network N2 to the stack's −45 degree polarised dipoles only. The amplifier A1 is connected to the first port, and consequently beam B1 is generated with +45 degree polarisation. The second port, second corporate feed network N2 and −45 degree polarised dipoles are not used in this example.

FIG. 19 also illustrates the WCDMA access method, for which similar channelisation and scrambling processes are carried out albeit with differences in terminology appearing in parenthesis and change in code chip rate. In the WCDMA channelisation process, for the Forward Channel (or Downlink in WCDMA terminology), user channel data is multiplied by a channelisation code, which is a Direct Sequence spreading Code running at 3.84 Mcps (NB which is exactly 3.125× rate of 1.2288 Mcps), and also called an Orthogonal Variable spreading Factor (OVSF) Code. The channelisation or OVSF code is equivalent to the Walsh code used in the cdma access method. Other user data is spread using other OVSF codes within the same base station. The WCDMA channelisation process provides spread information for input to the scrambling process, which multiplies this information by a scrambling Code running at 3.84 Mcps. The scrambling code is equivalent to, and for the Forward Channel serves the same purpose as, the short PN spreading code used in the cdma access method.

Figure 20:
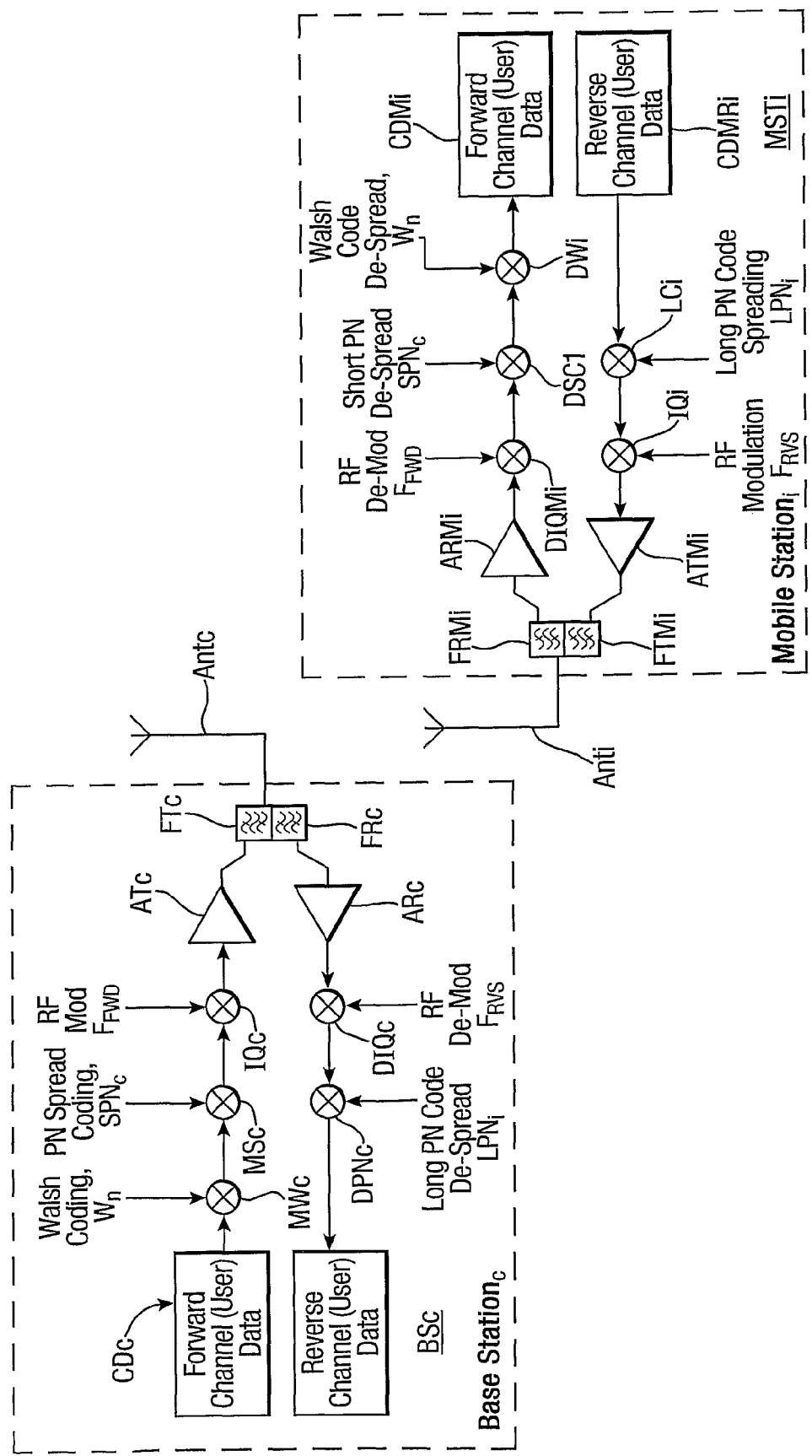
FIG. 20 is a generalised drawing of coding apparatus in a base station and a mobile station.

FIG. 20 is a brief qualitative illustration of cdma Forward Channel and Reverse Channel processing with a cth base station BSc and an ith mobile station MSTi such as a mobile telephone handset. To reduce complexity in the drawing, only one user data channel CDc is shown: user data in this channel is coded at MWc with a Walsh code Wn, coded at MSc with a PN Spread code SPNc, IQ modulated at IQc on to an RF base station transmit carrier frequency or forward frequency $F_{FWD}$ and amplified at Ac for filtering at FTc and transmission from an antenna Antc. This transmission is received by an antenna Anti of the mobile station MSTi. It is then filtered at FRMi, demodulated of the forward frequency $F_{FWD}$ at DIQMi, decoded of a short PN Spread code DSCi, decoded of the Walsh code at DWi, and passed on.

User data generated in the mobile station MSTi for transmission to the base station BSc is coded at LCi with a Long PN spreading code LPNi, IQ modulated at IQi on to an RF mobile station transmit carrier frequency or reverse frequency $F_{RVS}$ and amplified at ATMi for filtering at FTMi and transmission from the antenna Anti. This transmission is received by the base station antenna Antc. It is then filtered at FRc, demodulated of the reverse frequency $F_{RVS}$ at DIQc, decoded of the Long PN spreading code at DPNc, and passed on.

Figure 21:
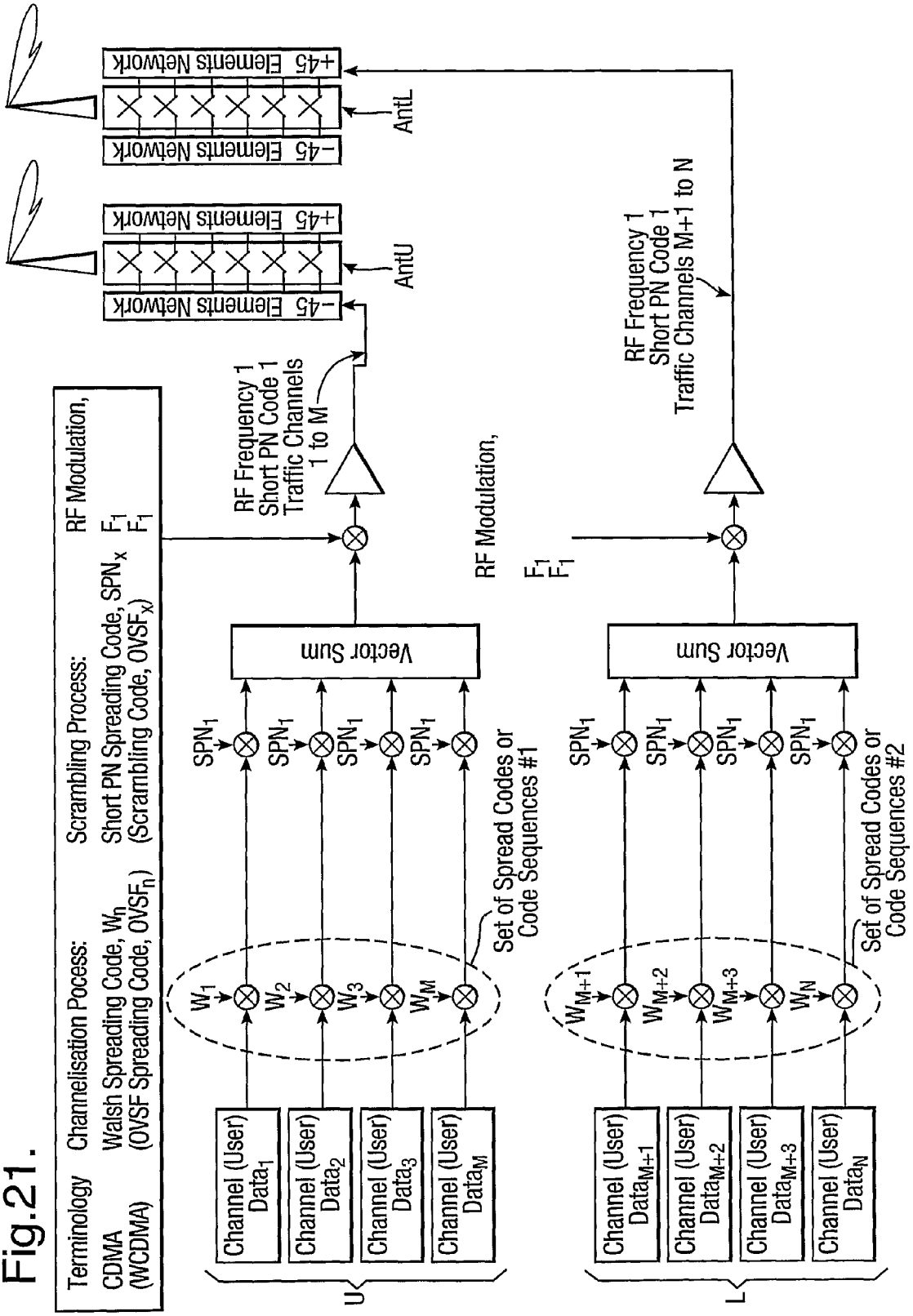
FIG. 21 illustrates the use of different sets of channelisation process codes in two groups of channels.

FIG. 21 indicates how FIG. 19 might be modified to implement two separate cells using the same spreading code SPN1. FIG. 21 replicates the set of elements shown in FIG. 19 twice as upper and lower sets indicated generally by U and L respectively, each set being used in implementing a respective group of data channels and a respective cell: it will not be described in detail. In the channelisation process, upper set U uses a first set #1 of Walsh codes $W_1$ to $W_M$ for an upper group of data channels, and lower set L uses a second (different) set #2 of Walsh codes $W_{M+1}$ to $W_N$ for a lower group of data channels. In the scrambling process, both channel sets U and L use the same short PN spreading code SPN1. Coded signals generated by the upper and lower sets U and L are transmitted at the same frequency RF1 from different antennas AntU and AntL respectively. The two different sets of Walsh codes #1 and #2 distinguish the two cells' transmissions from one another, enabling mobile stations to decode appropriate signals.

Figure 22:
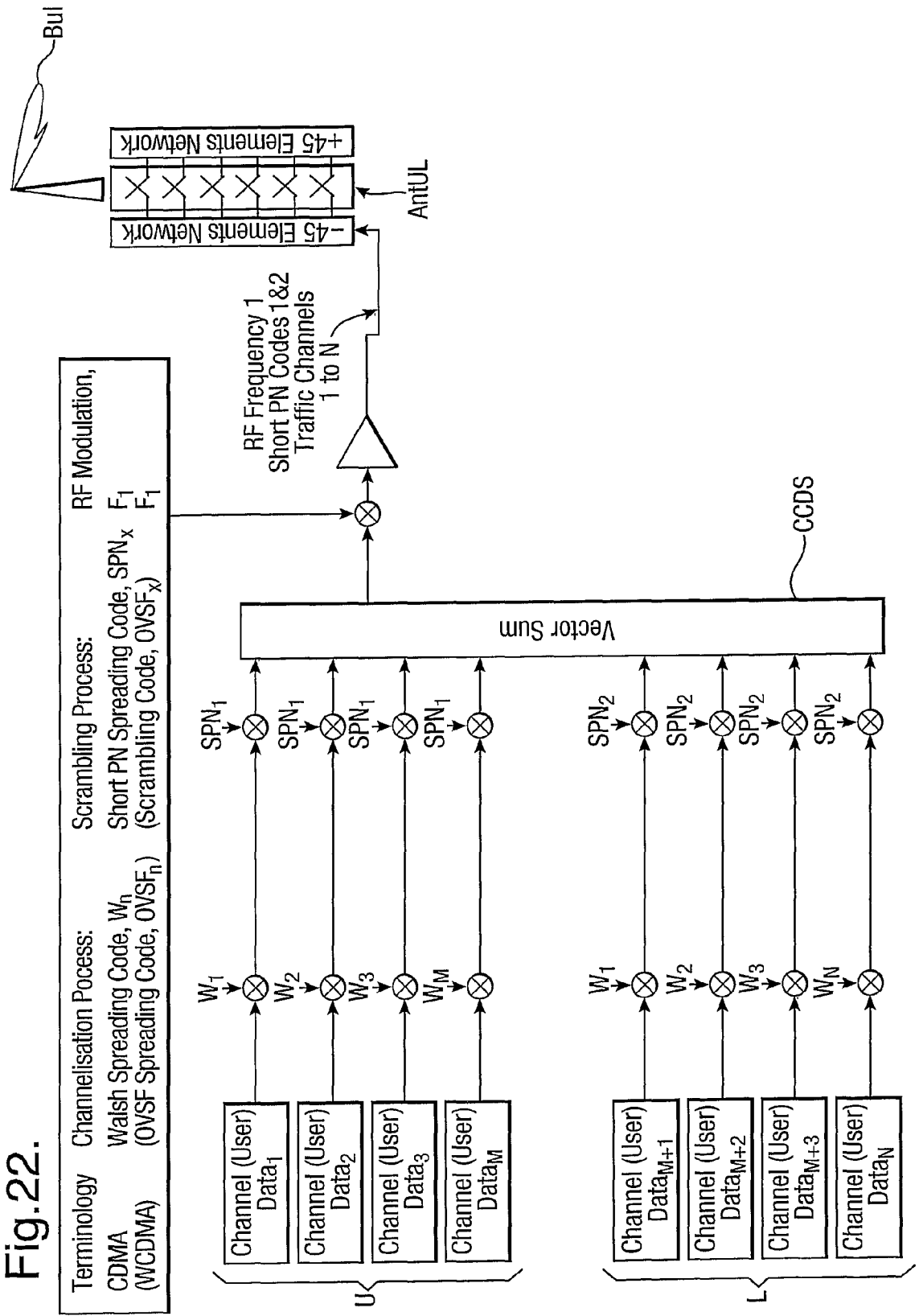
FIG. 22 illustrates the use of different scrambling process codes with two groups of channels and a single antenna beam configuration.

FIG. 22 gives an alternative approach to modifying FIG. 19 to implement two separate cells: in this approach the two channel sets or groups of data channels U and L use like coding for the channelisation process but different coding for the scrambling process. Here again FIG. 22 twice replicates elements shown in FIG. 19, but in this case up to but not including vector summer CDS. Instead upper and lower channel sets U and L are vectorially sum together, but each set still implements a respective cell. Walsh coding is similar to that described in relation to FIG. 19; i.e. if the channel sets U and L have equal numbers of channels M, they both use the same set of Walsh codes $W_1$ to $W_M$. If upper set U has M channels, lower set L has N channels and N>M, then Upper set U uses Walsh codes $W_1$ to $W_M$ and lower set L also uses Walsh codes $W_1$ to $W_M$ but augmented by a further N-M Walsh codes $W_{M+1}$ to $W_N$.

Upper set U uses a first short PN spreading code SPN1 for the scrambling process, whereas lower set L uses a second short PN spreading code SPN2 for that process. These different spreading codes SPN1 and SPN2 and associated scrambling processes distinguish from one another the two cells implemented by the channel sets U and L respectively. After the scrambling process, the two channel sets U and L are combined by a single common vector summation at CCDS, and after conversion to RF the summed signal is transmitted at the same frequency RF1 from dipoles of one (+45 degree) polarisation of a single antenna AntUL as a single beam Bul. The two different spreading codes SPN1 and SPN2 enable mobile stations to isolate data from a single cell in the transmitted signal by appropriate decoding as described earlier.

Figure 23:
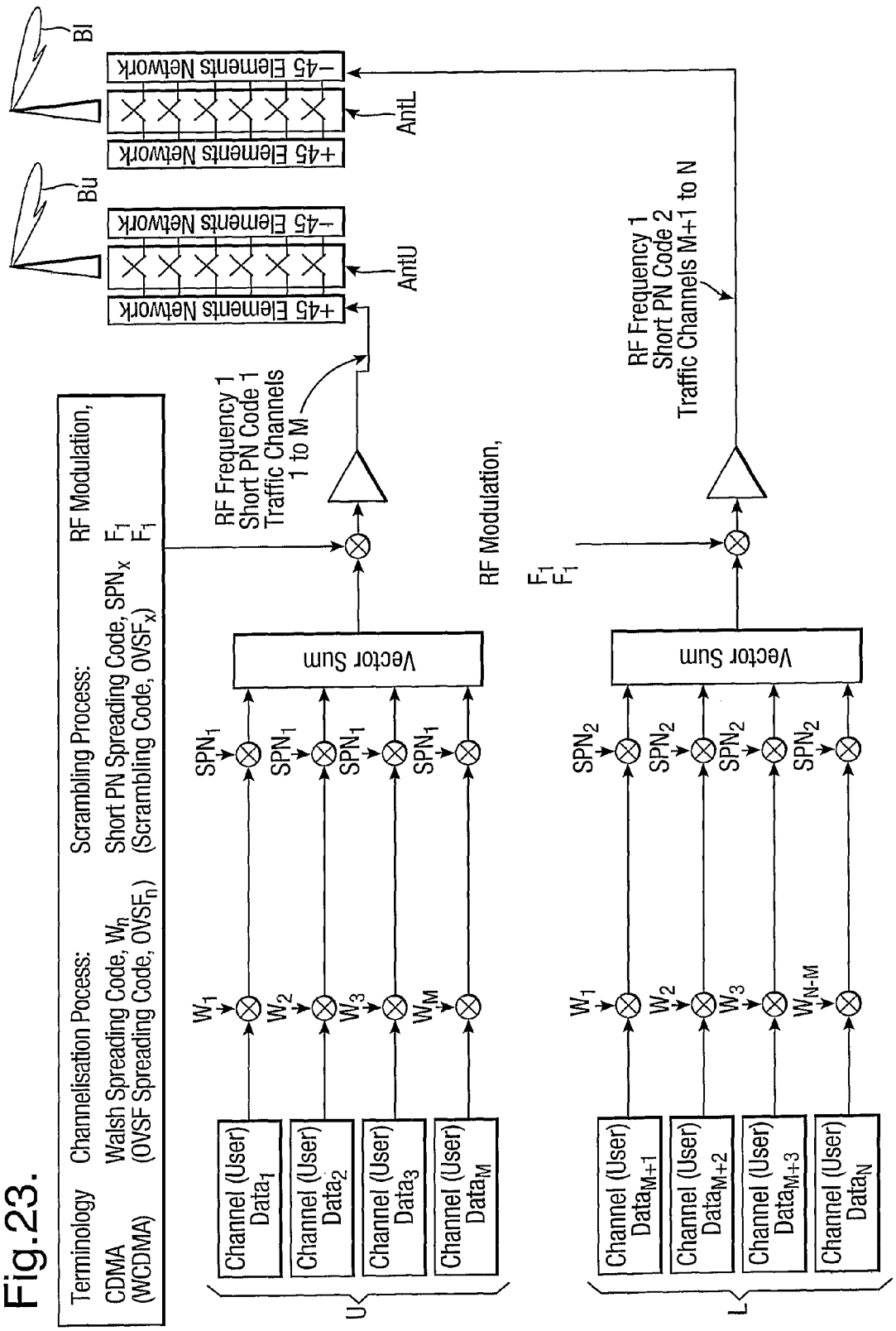
FIG. 23 is equivalent to FIG. 22 modified to employ two antennas.

FIG. 23 is an alternative to FIG. 22, and here once more the channel sets or groups of data channels U and L use like coding for the channelisation process but different coding for the scrambling process, i.e. like Walsh code sets W1 etc. but different spreading codes SPN1 and SPN2. Here again FIG. 23 twice replicates elements shown in FIG. 19, but in this case all such elements up to and including different antennas AntU and AntL. The two channel sets U and L are separately vector summed, converted to RF and transmitted at the same frequency RF1 from separate first and second antennas AntU and AntL, which are spaced apart from one another. Data from upper channel set U is transmitted from dipoles of positive (+45 degree) polarisation of the single first antenna AntU as a single positive (+) polarisation beam Bu. Likewise, data from lower channel set L is transmitted from dipoles of the orthogonal or negative (−45 degree) polarisation of the single second antenna AntL as a single negative (−) polarisation beam Bl. Here again the two different spreading codes SPN1 and SPN2 enable mobile stations to recover appropriate data.

Figure 24:
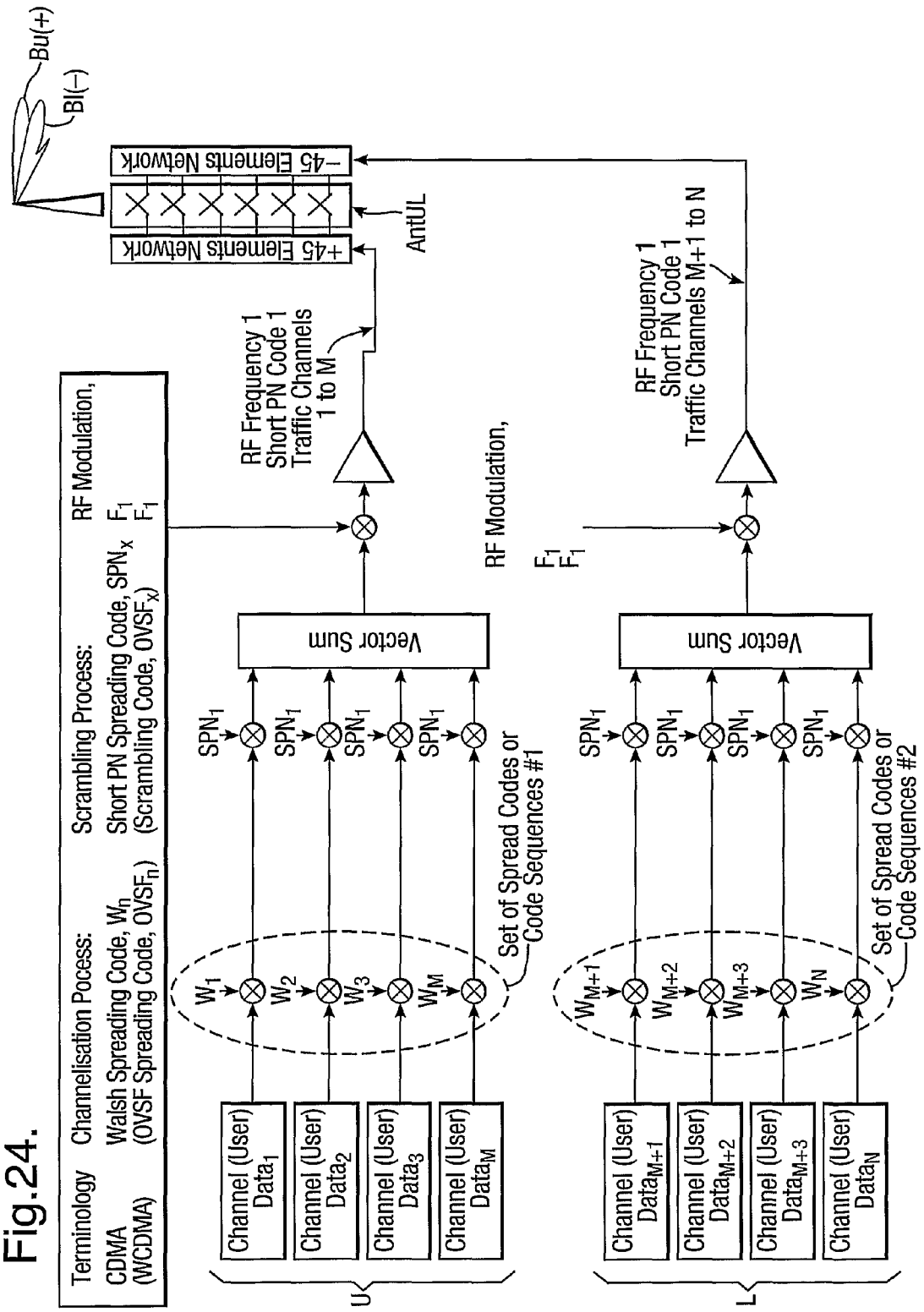
FIG. 24 is a schematic drawing of an embodiment of the invention using different sets of channelisation process codes in two groups of channels and two antenna beams from a single antenna.
Figure 25:
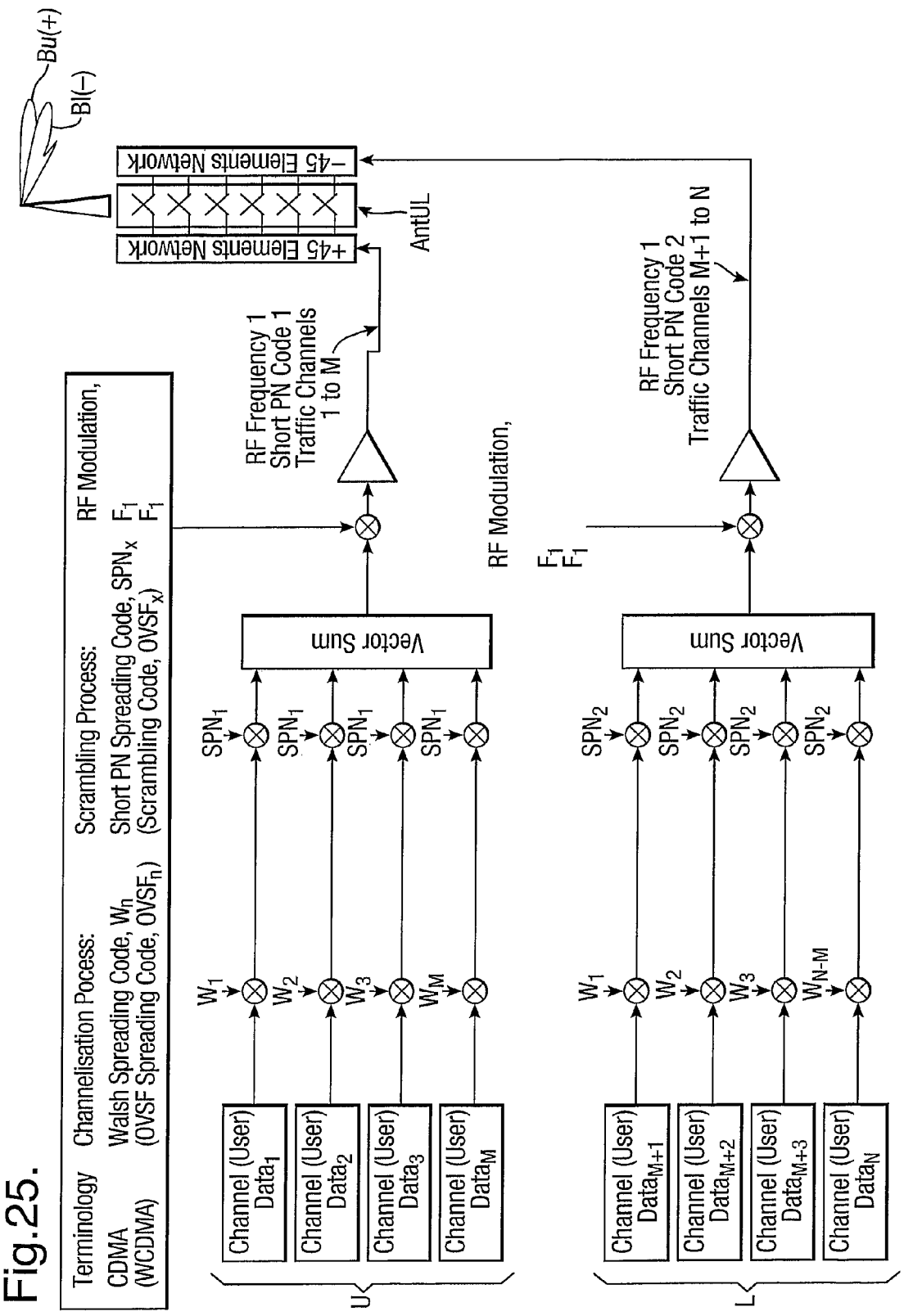
FIG. 25 is a schematic drawing of an embodiment of the invention using different scrambling process codes in two groups of channels and two antenna beams from a single antenna.

Referring now to FIGS. 24 and 25, embodiments of the invention are shown schematically which are equivalent to FIGS. 21 and 23 respectively with modification in accordance with the invention to employ a single antenna stack for both channel sets or groups of data channels U and L. In view of the similarity of FIGS. 24 and 25 to FIGS. 21 and 23, description will be directed to aspects of difference. FIG. 24 shows the two channel sets U and L using different sets of Walsh codes but the same spreading code SPN1; i.e. different coding for the channelisation process but like coding for the scrambling process. FIG. 25 shows the two channel sets U and L using like sets of Walsh codes but different spreading codes SPN1 and SPN2, i.e. like coding for the channelisation process but different coding for the scrambling process. In both FIGS. 24 and 25, data from the two channel sets U and L is transmitted at the same RF carrier frequency RF1 from the same single antenna AntUL but with different polarisations; i.e. in each case data from upper channel set U is transmitted from dipoles of one (positive or +45 degree) polarisation of the antenna AntUL as a positive polarisation (+) first beam Bu, and data from lower channel set L is transmitted from dipoles of the orthogonal (negative or −45 degree) polarisation of the same antenna AntUL as a negative polarisation (−) second beam Bl. Mobile stations recover data by decoding the different sets of Walsh codes $W_1$ etc. and $W_{M+1}$ etc. or the two different spreading codes SPN1 and SPN2 as appropriate.

FIGS. 24 and 25 both use an antenna with a X-polar (cross-polar) or dual polarisation function. As described in relation to FIG. 4 for example, such an antenna may have a respective two inputs for each polarisation and a corporate feed arrangement which has the ability to tilt independently by orthogonal polarisation and frequency: this makes it possible to tilt independently the Forward (Downlink) channel, the Reverse (Uplink) channel, and the Reverse Diversity (Uplink Diversity) channel for two base stations connected to the antenna. With such an antenna, two base stations using different Forward Channel Short PN Codes for the cdma access method (or scrambling Codes for the WCDMA access method) can be accommodated at the same single antenna, and yet the base stations may have different service footprints (cells) by virtue of independent tilt control per base station. This brings classic cell-splitting to the elevation plane without resorting to using additional separate antenna assemblies, unlike the prior art.

The present invention also provides for different beams supporting different sets of spread codes, i.e. user/terminal orientated codes, Walsh codes for Forward Channel and Long PN Codes for Reverse Channel. However, here again a single antenna creates two beams in elevation and supports different subscribers.

The antennas or antenna stacks Ant1, AntU, AntL and AntUL shown in FIGS. 19 and 21 to 25 are known prior art devices: each consists of a stack of pairs of crossed dipoles; here a stack is a single line (often but not necessarily vertical) of antenna elements such as dipoles or crossed dipoles or patches. In the present case the pairs of crossed dipoles are successively disposed to form a linear vertical array. A crossed dipole pair is two dipoles such as D(+)1 and D(−)1 sharing a common centre and extending outwardly from that centre at right angles to one another. The dipoles of each pair are polarised orthogonally to one another, i.e. as illustrated at +45 degrees (positive polarisation) and −45 degrees (negative polarisation) to the vertical respectively for an antenna stack which extends vertically. Each antenna is equivalent to two vertical dipole arrays which are orthogonal to one another and therefore isolated from one another at RF frequency. Each such dipole array is connected to a respective single antenna port by a respective corporate feed network, so each of the antennas Ant1, AntU, AntL and AntUL has two orthogonal ports each connected to a linear vertical array of like-polarised dipoles. Because the ports are orthogonal, a signal input to one port is substantially isolated from a signal input to the other port.

In FIGS. 24 and 25, a tilt controller 70 (see FIG. 4) may be provided to convert the respective signal passing to each polarisation of the antenna AntUL into two signals with a variable phase difference or time delay therebetween for control of angle of electrical tilt. The antenna AntUL is then of the kind that has two respective ports per polarisation, i.e. in these examples four ports, and the angles of electrical tilt of the beams Bu and Bl are controlled by varying the respective phase differences or time delays associated therewith. The two beams Bu and Bl then have angles of electrical tilt which are adjustable independently of one another.

Antenna stacks are known which incorporate antenna elements each consisting of three antenna dipoles arranged mutually orthogonally. Such a stack then provides beams with three polarisations: with two respective ports per polarisation, i.e. six ports in this example, and a tilt controller 70. the angles of electrical tilt of the three beams may be controlled independently by varying individually three phase differences or time delays.

The invention claimed is:

1. An antenna system comprising:
an antenna assembly including a single antenna stack for providing a plurality of antenna beams with individually adjustable vertical angles of electrical tilt, wherein the antenna assembly comprises only passive elements, wherein the antenna system is configured to transmit data in groups of data channels via the antenna beams, wherein each of the groups comprises at least one data channel;
coding means for applying a coding to the data in the data channels to implement a channelisation process and a scrambling process with the coding in at least one of the channelization process and the scrambling process differing between the groups of data channels to enable the data associated with individual data channels to be distinguished, wherein the coding means is arranged to apply like coding to the groups of data channels for the channelization process with a different coding to the groups of data channels for the scrambling process; and
a tilt controller for separately adjusting the individually adjustable vertical angle of electrical tilt for each of the plurality of antenna beams relative to another one of the plurality of antenna beams, wherein each of the plurality of antenna beams is transmitted via a same set of antenna elements of the single antenna stack as other antenna beams of the plurality of antenna beams, wherein the single antenna stack is arranged to provide the antenna beams with mutually orthogonal polarisations, wherein the single antenna stack has a plurality of ports per polarisation, and wherein the tilt controller controls a time delay between signals applied to ports associated with like polarisation to provide antenna beam tilt control.

2. The antenna system according to claim 1 wherein the scrambling process is arranged to provide a different coding for the data channels associated with different antenna beams.

3. The antenna system according to claim 1 wherein the single antenna stack is arranged to provide at least two antenna beams with mutually orthogonal polarisations and wherein the scrambling process is arranged to provide a different coding for orthogonally polarised antenna beams.

4. An antenna system comprising:
an antenna assembly including a single antenna stack for providing a plurality of antenna beams with individually adjustable vertical angles of electrical tilt, wherein the antenna assembly comprises only passive elements, wherein the antenna system is configured to transmit data in groups of data channels via the antenna beams, wherein each of the groups comprises at least one data channel;
coding means for applying a coding to the data in the data channels to implement a channelisation process and a scrambling process with the coding in at least one of the channelization process and the scrambling process differing between the groups of data channels to enable the data associated with individual data channels to be distinguished, wherein the coding means is arranged to apply a different coding to the groups of data channels for the channelisation process with a like coding to the groups of data channels for the scrambling process; and
a tilt controller for separately adiustinq the individually adiustable vertical angle of electrical tilt for each of the plurality of antenna beams relative to another one of the plurality of antenna beams, wherein each of the plurality of antenna beams is transmitted via a same set of antenna elements of the single antenna stack as other antenna beams of the plurality of antenna beams, wherein the single antenna stack is arranged to provide the antenna beams with mutually orthogonal polarisations, wherein the single antenna stack has a plurality of ports per polarisation, and wherein the tilt controller controls a time delay between signals applied to ports associated with like polarisation to provide antenna beam tilt control.

5. The antenna system according to claim 1, wherein the antenna system is configured for use with multiple non-contiguous frequencies, the antenna system further comprising:
filters for combining radio frequency transmit signals of different frequencies for input to the single antenna stack in combination; and
splitters for dividing receive signals between different receivers.

6. The antenna system according to claim 1, wherein the antenna system is configured for use with multiple contiguous frequencies, wherein the single antenna stack comprises orthogonal antenna ports, and wherein the antenna system further comprises:
- means for dividing the multiple contiguous frequencies into non-contiguous frequency groups containing filter separable frequencies;
- isolating filters for combining radio frequency transmit signals of different non-contiguous frequencies for input to the single antenna stack in combination with the non-contiguous frequency groups arranged to pass to respective orthogonal antenna ports; and
- splitters for dividing receive signals between different receivers.

7. The antenna system according to claim 1, wherein the antenna system is configured for use with multiple sectors, wherein the antenna system further comprises coupling means arranged to combine signals coded differently in the scrambling process and to generate therefrom antenna beams for different sectors such that each sector has antenna beams with a different scrambling process coding.

8. A method for communications, comprising:
- arranging a single antenna stack of an antenna assembly to provide a plurality of antenna beams with individually adjustable vertical angles of electrical tilt, wherein the antenna assembly comprises only passive elements;
- using groups of data channels to provide data for transmission via the antenna beams, wherein each group comprises at least one data channel;
- applying a coding to the data in the data channels to implement a channelisation process and a scrambling process with the coding in at least one of the channelization process and the scrambling process differing between the groups of data channels to enable the data associated with individual data channels to be distinguished, wherein the applying the coding to the data comprises one of:
  - applying a like coding to the groups of data channels for the channelisation process with a different coding to the groups of data channels for the scrambling process; or
  - applying a different coding to the groups of data channels for the channelisation process with a like coding to the groups of data channels for the scrambling process; and
- separately adjusting the individually adjustable vertical angle of electrical tilt for each of the plurality of antenna beams relative to another one of the plurality of antenna beams, wherein each of the plurality of antenna beams is transmitted via a same set of antenna elements of the single antenna stack as other antenna beams of the plurality of antenna beams, wherein the single antenna stack is arranged to provide the antenna beams with mutually orthogonal polarisations and wherein the single antenna stack has a plurality of ports per polarisation, and wherein the separately adiustinq the individually adjustable vertical angle of electrical tilt for each of the antenna beams comprises controlling a time delay between signals applied to ports associated with like polarisation to provide antenna beam tilt control.

9. The method for communications according to claim 8 wherein the applying the coding to the data comprises applying a different coding in the scrambling process for the data channels associated with different antenna beams.

10. The method for communications according to claim 8 wherein at least two of the antenna beams have mutually orthogonal polarisations and wherein the scrambling process is arranged to provide a different coding for orthogonally polarised antenna beams.

11. The method for communications according to claim 8, wherein the method is for use with multiple non-contiguous radio frequencies the method further comprising using isolating filters to:
- combine transmit signals of different non-contiguous radio frequencies for input to the single antenna stack in combination; and
- divide receive signals between different receivers.

12. The method for communications according to claim 8 wherein the method is for use with multiple contiguous radio frequencies, wherein the singe antenna stack has orthogonal antenna ports, the method further comprising:
- dividing transmit signal frequencies into non-contiguous frequency groups containing filter separable frequencies;
- using isolating filters to combine transmit signals in each of the non-contiguous frequency groups with other transmit signals in that group but not with any signal of another group;
- passing the non-contiguous frequency groups to respective orthogonal antenna ports; and
- dividing receive signals between different receivers.

13. The method for communications according to claim 8 wherein the method is for use with multiple sectors, wherein the applying the coding to the data further comprises applying a plurality of forms of coding in the scrambling process, and wherein the method further comprises:
- combining signals having a different scrambling process coding; and
- generating therefrom the antenna beams for different sectors such that each sector has antenna beams with a different scrambling process coding.

* * * * *